United States Patent
Lim et al.

(10) Patent No.: US 11,258,938 B2
(45) Date of Patent: Feb. 22, 2022

(54) APPARATUS FOR MAPPING IMAGE TO POLYHEDRON ACCORDING TO LOCATION OF REGION OF INTEREST OF IMAGE, AND PROCESSING METHOD THEREFOR

(71) Applicant: Samsung Electronics Co., Ltd., Gyeonggi-do (KR)

(72) Inventors: Jinho Lim, Gyeonggi-do (KR); Donghyun Yeom, Gyeonggi-do (KR); Insu Yu, Gyeonggi-do (KR); Jongin Lee, Gyeonggi-do (KR); Seyoung Jang, Gyeonggi-do (KR); Byungpo Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 16/771,031

(22) PCT Filed: Dec. 20, 2018

(86) PCT No.: PCT/KR2018/016370
§ 371 (c)(1),
(2) Date: Jun. 9, 2020

(87) PCT Pub. No.: WO2019/125017
PCT Pub. Date: Jun. 27, 2019

(65) Prior Publication Data
US 2021/0176391 A1    Jun. 10, 2021

(30) Foreign Application Priority Data
Dec. 20, 2017    (KR) .................. 10-2017-0175890

(51) Int. Cl.
*H04N 5/232*    (2006.01)
*G06F 3/041*    (2006.01)
(Continued)

(52) U.S. Cl.
CPC ........ *H04N 5/23206* (2013.01); *G06F 3/041* (2013.01); *G06T 15/04* (2013.01); *G06T 17/30* (2013.01); *H04N 5/23238* (2013.01)

(58) Field of Classification Search
CPC .......... H04N 5/23206; H04N 5/23238; H04N 5/23229; H04N 5/247; H04N 5/232933;
(Continued)

(56) References Cited

U.S. PATENT DOCUMENTS 5,923,334 A * 7/1999 Luken ................... G06T 15/205
345/423
6,879,338 B1 * 4/2005 Hashimoto .......... H04N 5/2251
348/36
(Continued)

FOREIGN PATENT DOCUMENTS

JP       2005-56295 A      3/2005
KR    10-2015-0129548 A   11/2015
(Continued)

*Primary Examiner* — Abdelaaziz Tissire
(74) *Attorney, Agent, or Firm* — Cha & Reiter, LLC

(57) ABSTRACT

An electronic device is disclosed. The electronic device comprises a plurality of cameras and a processor, wherein the processor may be configured to obtain a plurality of images using the plurality of cameras, to check a location of a region of interest among regions of the plurality of images that will be mapped to a polyhedron using a first assignment method, to map the plurality of images to the polyhedron using a second assignment method if the location of the region of interest is included in assigned conditions, and to generate image data using the polyhedron to which the plurality of images are mapped.

15 Claims, 17 Drawing Sheets

(51) Int. Cl.
*G06T 17/30* (2006.01)
*G06T 15/04* (2011.01)

(58) Field of Classification Search
CPC ....... H04N 5/232127; H04N 5/232945; H04N 13/117; H04N 13/282; G06F 3/041; G06K 9/00; G06K 9/00208; G06T 17/10; G06T 17/30; G06T 1/20; G06T 5/50; G06T 1/0007; G06T 15/20; G06T 3/0018; G06T 3/0062; G06T 2207/20016; G06T 2207/20021; G06T 2207/20068
See application file for complete search history.

(56) References Cited

U.S. PATENT DOCUMENTS

| | | | |
|---|---|---|---|
| 2004/0105597 A1* | 6/2004 | Lelescu | G06T 3/0018 |
| | | | 382/276 |
| 2008/0291217 A1 | 11/2008 | Vincent et al. | |
| 2009/0063419 A1* | 3/2009 | Nurminen | G06F 16/1834 |
| 2010/0001997 A1* | 1/2010 | Kajikawa | G06T 15/20 |
| | | | 345/419 |
| 2014/0218354 A1 | 8/2014 | Park et al. | |
| 2016/0073173 A1 | 3/2016 | Na et al. | |
| 2016/0112704 A1 | 4/2016 | Grange et al. | |
| 2016/0156912 A1 | 6/2016 | Alshina et al. | |
| 2017/0236323 A1 | 8/2017 | Lim et al. | |
| 2017/0358126 A1* | 12/2017 | Lim | H04N 13/178 |
| 2017/0374385 A1* | 12/2017 | Huang | H04N 19/105 |
| 2018/0063512 A1* | 3/2018 | Hong | H04N 13/261 |
| 2018/0098090 A1* | 4/2018 | Lin | H04N 19/174 |
| 2018/0225876 A1 | 8/2018 | Lim et al. | |
| 2018/0322611 A1* | 11/2018 | Bang | G06T 3/0087 |
| 2020/0058165 A1* | 2/2020 | Choi | G06T 15/20 |

FOREIGN PATENT DOCUMENTS

| | | |
|---|---|---|
| KR | 10-2017-0141081 A | 12/2017 |
| KR | 10-2018-0091381 A | 8/2018 |

* cited by examiner

APPARATUS FOR MAPPING IMAGE TO POLYHEDRON ACCORDING TO LOCATION OF REGION OF INTEREST OF IMAGE, AND PROCESSING METHOD THEREFOR

CROSS-REFERENCE TO RELATED APPLICATION(S)

This application is a National Phase Entry of PCT International Application No. PCT/KR2018/016370, which was filed on Dec. 20, 2018, and claims priority under 35 U.S.C. § 119 of Korean Patent Application No. 10-2017-0175890, filed on Dec. 20, 2017 in the Korean Intellectual Property Office the disclosure of which is incorporated herein by reference in its entirety.

TECHNICAL FIELD

The disclosure generally relates to an apparatus for processing an image and a method of processing an image thereof, and more particularly to an apparatus for processing an image to efficiently transmit and receive an image and a method of processing an image thereof.

BACKGROUND ART

An omnidirectional image camera system refers to a camera system capable of capturing images in all directions at 360 degrees from a fixed point of sight. An omnidirectional image is an image including all views capable of being viewed by a viewer spinning in place and views from a viewer tilting his/her head upwards or downwards. The omnidirectional image camera system installs a special mirror such as a hyperbolic mirror or a special lens such as a fisheye lens in a camera, or uses a plurality of cameras to capture images in all directions.

Research on an omnidirectional-video-coding method of transmitting image information generated by the omnidirectional image camera system to another electronic device has been actively conducted.

Particularly, methods of more efficiently compressing omnidirectional images using a video codec such as MPEG-4 or H.264 have been researched. Representatively, there is a method of reducing the amount of data on a compressed image by mapping the omnidirectional image to a two-dimensional planar image. The method of mapping the omnidirectional image includes, for example, a cartographical projection method or a polygonal projection method of performing two-dimensional plane mapping in consideration of camera attributes such as calibration parameters.

DETAILED DESCRIPTION OF THE INVENTION

Technical Problem

However, the omnidirectional image is a large image captured in all directions, and thus a problem of overloading of a system for transmitting and receiving the image (for example, excessive bandwidth resource use and increased image-processing speed) cannot be sufficiently solved through the compression method.

Further, there is a problem of distortion generated in a process of mapping the three-dimensional spatial image included in the omnidirectional image to the two-dimensional planar image.

Accordingly, there is a need for further effort to find a method of minimizing overloading of the system for transmitting and receiving the omnidirectional image and distortion of the omnidirectional image while maintaining a Quality of Service (QoS) from the viewpoint of the user of the omnidirectional image.

The disclosure has been made to solve the problem, and an aspect of the disclosure is to provide an apparatus for processing an image and a method of processing an image to reduce image distortion and minimize the use of bandwidth resources when omnidirectional images are processed.

Technical Solution

In accordance with an aspect of the disclosure, an electronic device is provided. The electronic device includes: a plurality of cameras; and a processor, wherein the processor is configured to acquire a plurality of images through the plurality of cameras, identify the location of a region of interest to be mapped to a polyhedron through a first predetermined scheme among regions of the plurality of images, map the plurality of images to the polyhedron through a second predetermined scheme when the location of the region of interest is included in a predetermined condition, and generate image data using the polyhedron to which the plurality of images is mapped.

In accordance with another aspect of the disclosure, an electronic device is provided. The electronic device includes: a plurality of cameras; and a processor, wherein the processor is configured to acquire a plurality of images using the plurality of cameras, identify a location of a region of interest to be mapped to a polyhedron through a first predetermined scheme among regions of the plurality of images, map the plurality of images to the polyhedron through the first predetermined scheme when the location of the region of interest is included in a first predetermined condition, map the plurality of images to the polyhedron through a second predetermined scheme when the location of the region of interest is included in a second predetermined condition, and generate image data using the polyhedron to which the plurality of images is mapped through one of the first predetermined scheme or the second predetermined scheme.

In accordance with another aspect of the disclosure, an electronic device is provided. The electronic device includes: a plurality of cameras; and a processor, wherein the processor is configured to acquire a plurality of images using the plurality of cameras, map the plurality of images to a polyhedron through a first predetermined scheme, identify a location of a region of interest among the plurality of images mapped to the polyhedron, map the plurality of images to the polyhedron through a second predetermined scheme when the location is included in a predetermined condition in connection with the plurality of images mapped to the polyhedron, and generate image data using the polyhedron to which the plurality of images is mapped through the second predetermined scheme.

Advantageous Effects

According to the disclosure as described above, it is possible to minimize image distortion and the use of bandwidth resources when omnidirectional images are processed.

MODE FOR CARRYING OUT THE INVENTION

Figure 1:
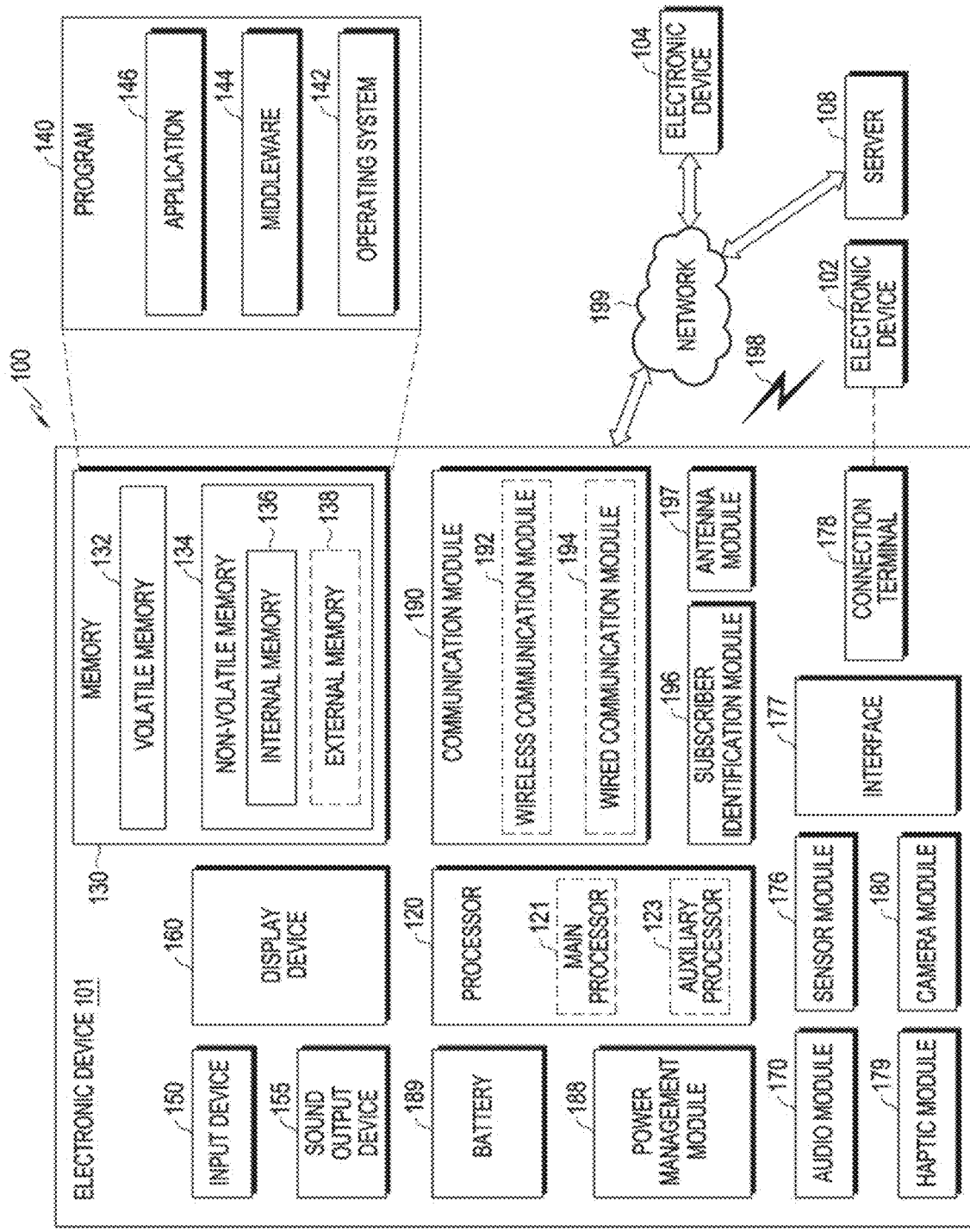
FIG. 1 illustrates a network environment according to various embodiments of the disclosure.

Hereinafter, various embodiments of the disclosure will be described in detail with reference to the accompanying drawings. It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements.

As used herein, the expression "have", "may have", "include", or "may include" refers to the existence of a corresponding feature (e.g., numeral, function, operation, or constituent element such as component) and does not exclude the existence of additional features.

As used herein, the expression "A or B", "at least one of A and/or B", or "one of more of A and/or B" may include all possible combinations of items enumerated together. For example, "A or B", " "at least one of A and B", or "at least one of A or B" may refer to all of (1) including at least one A, (2) including at least one B, or (3) including all of at least one A and at least one B.

The expressions "a first", "a second", "the first", "the second", and the like as used in various embodiments may modify various elements regardless of the order and/or the importance thereof, and does not limit the corresponding elements. These expressions may be used to distinguish between one element and any other element. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it could be understood that when an element (e.g., first element) is referred to as being "directly connected," or "directly coupled" to another element (second element), there are no element (e.g., third element) interposed between them.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

FIG. 1 illustrates a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing and computation. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from the main processor 121. Additionally or alternatively, the auxiliary processor 123 may be adapted to consume less power than the main processor 121, or to be specific to a specified function. The auxiliary processor 123 may be operated separately from or embedded in the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 is a device configured to receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 is a device configured to output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 is a device configured to visually provide information to a user of the electronic device 101. The display device 160 may include, for example, a display, a hologram device, or a projector and control circuitry to control a corresponding one of the display, hologram device, and projector. According to an embodiment, the display device 160 may include touch circuitry, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may detect an operational state (e.g., power or temperature) in the electronic device 101 or an environmental state external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be coupled with the external electronic device (e.g., the electronic device 102) wiredly or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 is a module configured to manage power supplied to the electronic device 101. The power management module 188 may be implemented as at least part of, for example, a power management integrated circuit (PMIC).

The battery 189 is a device configured to supply power to at least one component of the electronic device 101. The battery 189 may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP))

and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules 190 may be implemented as a single chip, or may be implemented as multi chips separate from each other.

According to an embodiment, the wireless communication module 192 may identify and authenticate the electronic device 101 in a communication network, using user information stored in the subscriber identification module 196.

The antenna module 197 may include at least one of antenna for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the function or the service requested, with or without further processing of the outcome. To that end, a cloud computing, distributed computing, or client-server computing technology may be used, for example.

According to an embodiment, the processor 120 may acquire at least one image through a camera module 180. The processor 120 may determine the location of a region of interest to be mapped to a polyhedron in a predetermined method among at least one image region. Further, when the location of the region of interest is included in a predetermined condition, the processor 120 may map at least one image to a polyhedron through another predetermined method. In this case, the processor 120 may generate image data using the polyhedron to which at least one image is mapped.

Various embodiments proposed by the disclosure provide a method of transmitting and receiving omnidirectional images mapped to a two-dimensional image through multiple channels in order to efficiently transmit and receive the omnidirectional images.

The electronic device according to various embodiments may be one of various types of electronic devices. The electronic devices may include, for example, at least one of a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular expression may include plural expressions, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may use corresponding components regardless of importance or an order and be used to simply distinguish a corresponding component from another, without liming the components. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, or via another element (e.g., third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including an instruction that is stored in a computer-readable storage medium (e.g., internal memory 136 or external memory 138) that is readable by a machine (e.g., a computer). The machine is a device capable of invoking the instruction stored in the storage medium and being operated according to the instruction invoked, and may include the electronic device (e.g., electronic device 101) according to various embodiments. When the command is executed by a processor (e.g., the processor 120), the processor may directly execute a function corresponding to the command, or use other components to execute the function under the control of the processor. The command may include a code generated by a complier or a code executable by an interpreter.

The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) may include a single entity or multiple entities, and some of the above-described sub-components may be omitted, or other sub-components may be added. Alternatively or additionally, some components (e.g., modules or programs) may be integrated into a single component, and the integrated component may still perform functions of each of some components in the same or similar manner as they are performed by a corresponding one of some components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
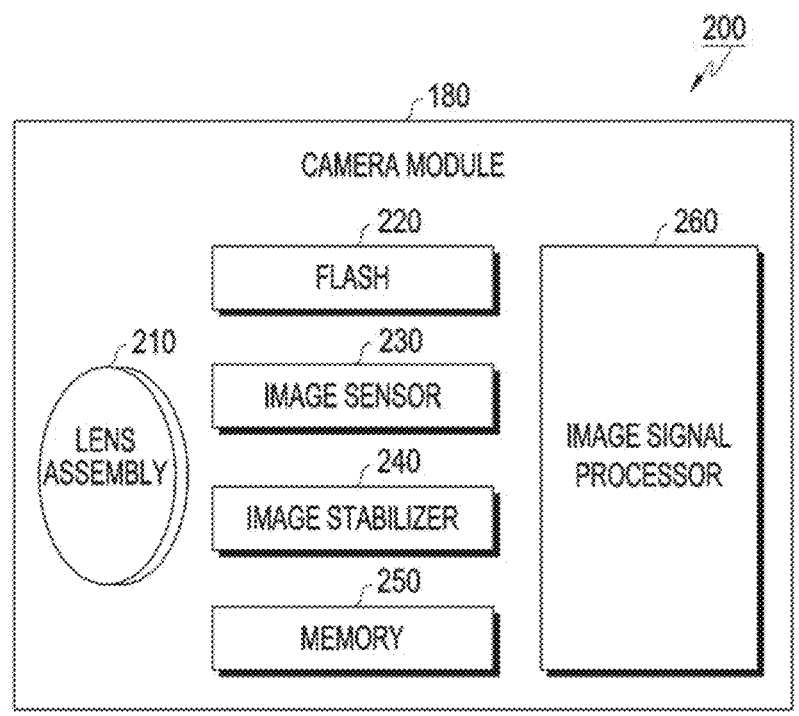
FIG. 2 is a block diagram of a camera module according to various embodiments.

FIG. 2 is a block diagram illustrating the camera module according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted from an object whose image is to be taken. The lens assembly 210 may include one or more lenses. According to an embodiment, the camera module 180 may include a plurality of lens assemblies 210. In such a case, the camera module 280 may be, for example, a dual camera, a 360-degree camera, or a spherical camera. A plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light emitted from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may be implemented, for example, as an optical image stabilizer, and sense the movement, using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform image processing with respect to an image obtained via the image sensor 230 or an image stored in the memory 250. The image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, images processed by the image signal processor 260 may be displayed, by the processor 120, via the display device 160 as it is or after being further processed.

According to an embodiment, the electronic device 101 may include two or more camera modules 180 having different attributes or functions. In such a case, at least one of the two or more camera modules 180 may form, for example, a wide-angle camera or a front camera, and at least another of the two or more camera modules may form a telephoto camera or a rear camera.

Figure 3:
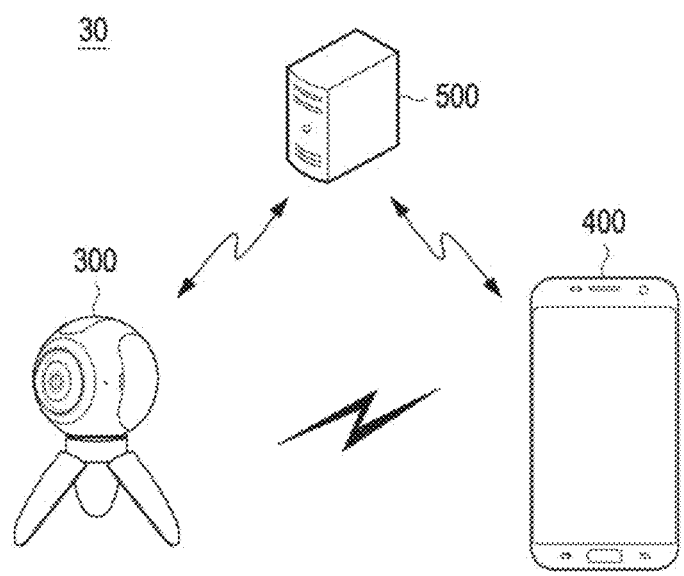
FIG. 3 illustrates an example of implementation of an image-processing system according to various embodiments of the disclosure.

FIG. 3 illustrates an example of implementation of an image-processing system according to various embodiments of the disclosure.

An image-processing system 30 is a system for transmitting/receiving an omnidirectionally captured image, performing rendering, and providing the image to the user.

The image-processing system 30 may include a first image-processing device 300 and a second image-processing device 400. Alternatively, the image-processing system 30 may include a first image-processing device 300, a second image-processing device 400, and a server 500.

The first image-processing device 300 may be a photographing device for taking an omnidirectional image or a server for receiving the omnidirectional image from the outside and processing the same. Of course, the disclosure is not limited thereto, and the first image-processing device 300 may be implemented as the examples of the electronic device.

For example, the first image-processing device 300 may be a photographing device 300.

The photographing device 300 may capture an image omnidirectionally. In general, it is not easy to capture an image omnidirectionally through a single camera. Accordingly, the photographing device 300 may include a plurality of lenses or a plurality of cameras in order to capture the omnidirectional image.

For example, a fisheye lens may have an angle of view equal to or wider than 180 degrees. That is, when the fisheye lens is oriented to face the sky, it is possible to capture an area from the constellations in the sky to the horizon within one image. The photographing device 300 may include a plurality of fisheye lenses, and may thus capture an image omnidirectionally. In another example, the photographing device 300 may include a plurality of cameras having a predetermined angle of view and capture an image omnidirectionally. In this case, the plurality of cameras may be included in the photographing device 300 to cover all directions from one point. In another example, the photographing device 300 including one or more cameras may move automatically and/or manually (in a direction of pitch, yaw, and roll) and capture images omnidirectionally. In another example, the photographing device 300 may include a plurality of cameras having predetermined angles of view corresponding to left and right eyes of the user. In this case, the photographing device 300 may capture a stereoscopic image including a plurality of omnidirectional images by capturing images omnidirectionally. Examples of the photographing device 300 are not limited thereto.

Meanwhile, the photographing device 300 may capture not only the omnidirectional images but also an image in some directions (for example, a rectangular area corresponding to 120 degrees upwards, downwards, leftwards, and rightwards based on the lens of the photographing device 300). The photographing device 300 may capture omnidirectional images, process images in some directions among the omnidirectional images, and transmit the processed images to the second image-processing device 400.

Meanwhile, the photographing device 300 may correlate and record captured images and relevant metadata (for example, a capturing direction, range, area, or location). In this case, the photographing device 300 may correlate at least one of metadata, that is, the camera location, motion information, and direction information received through a sensor (for example, a GPS sensor, a Wi-Fi fingerprint sensor, a gyro sensor, an acceleration sensor, or a geomagnetic sensor), with at least one of camera characteristic information (for example, camera calibration parameters and photographing state information) and the captured image.

Further, the photographing device 300 may map captured omnidirectional images to a two-dimensional planar image, encode the mapped two-dimensional planar image, store the same in the memory, or transmit the same to the second image-processing device 400.

According to an embodiment, the mapped two-dimensional planar image may include a region in which triangular faces of the polyhedron are arranged in a two-dimensional plane when omnidirectional images are mapped to a polyhedron having triangular faces.

According to an embodiment, the omnidirectional image may be an image independent from a polyhedron related to the two-dimensional planar image. For example, the omnidirectional image may be an image mapped to a two-dimensional planar image through an Equirectangular Projection (ERP), cube projection, or cylindrical projection scheme. According to another embodiment, the omnidirectional image may be an image associated with depth information determined through a distance sensor (for example, a Kinect™ camera, lidar, a stereo camera, or a laser distance measurement device).

According to another embodiment, the photographing device 300 may be a virtual camera at a predetermined location in a virtual-reality space (for example, a 3D space implemented in a game). In this case, the omnidirectional image may be received image information correlated to virtual objects within a virtual-reality space on the basis of characteristics of the virtual camera (for example, location, oriented direction, viewing angle, or range). For example, in a game, an avatar's view may correspond to a Field of View (FoV) of a virtual camera, and an object image area within a virtual reality displayed therethrough may be part of the omnidirectional image.

When the mapped two-dimensional image is encoded and transmitted to the second image-processing device 400, the photographing device 300 may use a plurality of transmission channels. According to an embodiment, the mapped two-dimensional image may include a plurality of image regions having preset array attributes. In this case, the photographing device 300 may transmit image data of at least one image area among a plurality of image areas through at least one of a plurality of transmission channels that match respective ones of the plurality of image areas. In this case, the photographing device 300 may also transmit metadata including the preset array attributes.

The photographing device 300 may transmit image data of at least one image area among the plurality of image areas on the basis of viewing angle information. For example, the photographing device 300 may receive viewing angle information of the user from the second image-processing device 400, determine at least one image area among the plurality of image areas corresponding to the received viewing angle information, and transmit at least one image area to the second image-processing device 400.

The server 500 may process the pre-stored omnidirectional image or ERP image and transmit the same.

According to an embodiment, the server 500 may receive the omnidirectional image or the ERP image from the photographing device 300 and store the same. In this case, the server 500 may map the omnidirectional image or the ERP image to a two-dimensional image. According to an embodiment, the server may encode the mapped two-dimensional image and transmit the two-dimensional image to the second image-processing device 400. In this case, the server may transmit the mapped two-dimensional image through a plurality of transmission channels. The same embodiment of the plurality of transmission channels described for the photographing device 300 may be applied to the server 500. An overlapping description of the photographing device 300 will thus be omitted herein.

The second image-processing device 400 may receive and render the omnidirectional image mapped to the two-dimensional image.

Specifically, the second image-processing device 400 may receive a bitstream of the mapped two-dimensional image from the first image-processing device 300 and decode the bitstream. The second image-processing device 400 may perform rendering using the decoded two-dimensional image and display the rendered frame on the display device 160.

According to an embodiment, the second image-processing device 400 may receive all of the omnidirectional images mapped to the two-dimensional image (hereinafter, referred to as a mapped two-dimensional image). In this case, the second image-processing device 400 may map all of the omnidirectional images mapped to the two-dimensional image to a virtual three-dimensional space and render an area corresponding to a FoV of the user.

According to another embodiment, the second image-processing device 400 may receive only some of the mapped two-dimensional image through at least one transport channel.

For example, the second image-processing device 400 may sense the viewing angle of the user and a center location of the viewing angle through a sensor and transmit the viewing angle of the user and the center location of the viewing angle to the first image-processing device 300.

The second image-processing device 400 may be any of various types of electronic devices for processing an image, for example, a Virtual Reality (VR) device such as a Head-Mounted Display (HMD), a mobile phone, a PC, a TV, or a tablet PC.

According to the above description, the first image-processing device 300 may transmit an image area corresponding to viewing angle information of the user (for example, the viewing angle of the user and the center location of the viewing angle) in the mapped two-dimensional image through a plurality of transmission channels, that is, may selectively transmit some of the plurality of image areas included in the mapped two-dimensional image, thereby significantly improving transmission efficiency.

Hereinafter, the process performed by the first image-processing device 300 and the second image-processing device 400 will be described with reference to FIGS. 4A and 4B.

Figure 4A:
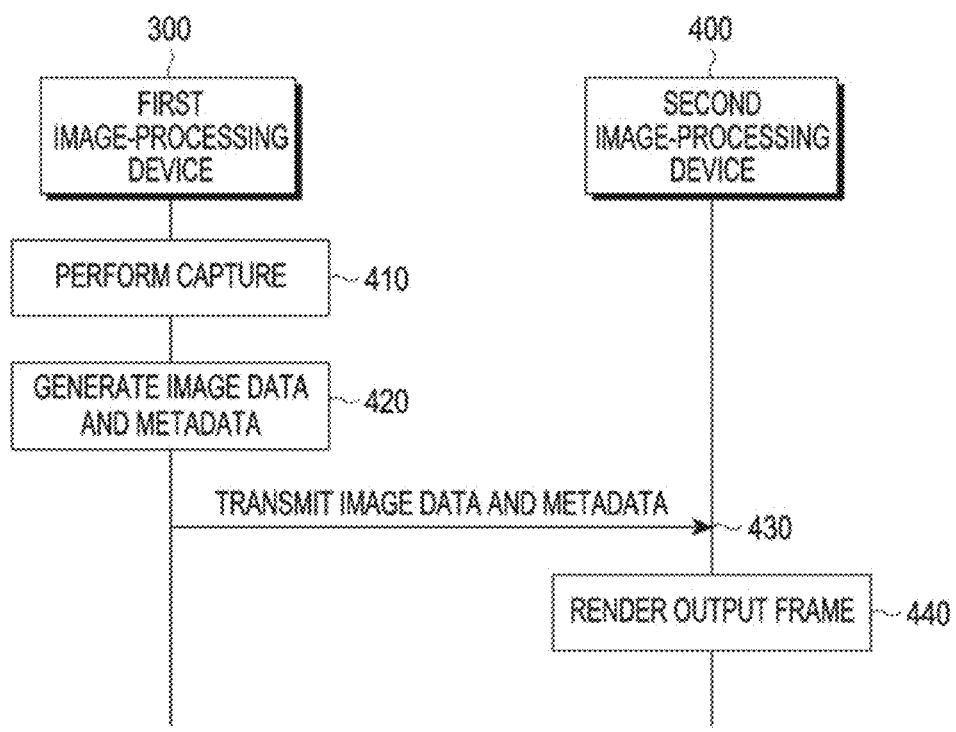
FIG. 4A is a flowchart illustrating image processing by an image-processing system according to an embodiment of the disclosure.

FIG. 4A is a flowchart illustrating image processing by an image-processing system according to an embodiment of the disclosure.

Referring to FIG. 4A, the first image-processing device 300 may capture an object or a surrounding environment in step 410. For example, the first image-processing device 300 may include a plurality of cameras covering all directions. In this case, the first image-processing device 300 may acquire a plurality of images through the plurality of cameras.

The first image-processing device 300 may generate image data. Specifically, the first image-processing device 300 may map the plurality of images to a polyhedron. In this case, the first image-processing device 300 may determine a method of mapping the plurality of images to the polyhedron on the basis of the location of a region of interest included in the plurality of images on the plurality of images. The first image-processing device 300 may generate metadata including information on the location of the region of interest in step 420.

The first image-processing device 300 may transmit the generated image data and metadata to the second image-processing device 400 in step 430.

The second image-processing device 400 may render an output frame using the received image data and metadata in step 440. In this case, the second image-processing device 400 may render the output frame including the region of interest on the basis of information on the location of the region of interest included in the metadata. For example, the region of interest included in the output frame may be rendered in a region corresponding to the location of the region of interest included in the plurality of images acquired by the first image-processing device 300.

Figure 4B:
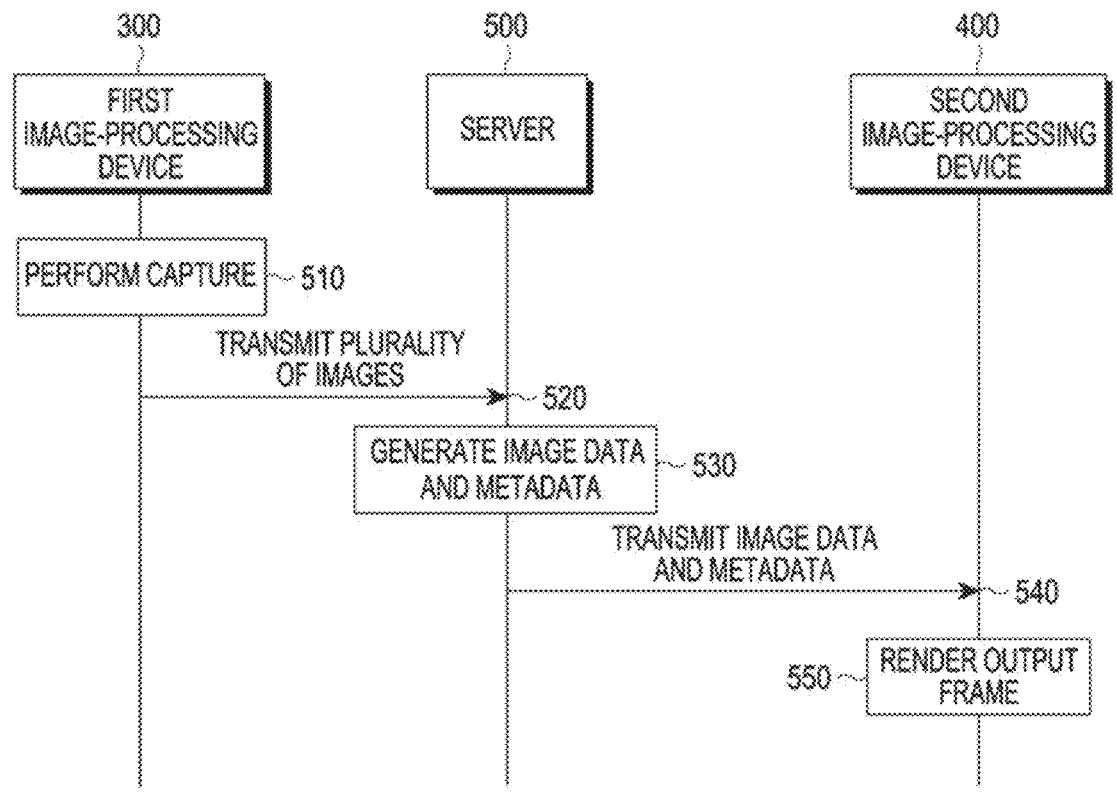
FIG. 4B is a flowchart illustrating image processing by the image-processing system according to another embodiment of the disclosure.

FIG. 4B is a flowchart illustrating image processing by the image-processing system according to another embodiment of the disclosure.

Referring to FIG. 4B, the first image-processing device 300 may capture an image of an object or a surrounding environment in step 510. For example, the first image-processing device 300 may include a plurality of cameras covering all directions. In this case, the first image-processing device 300 may acquire a plurality of images through the plurality of cameras. The first image-processing device 300 may transmit the plurality of acquired images to the server 500 in step 520.

The server 500 may generate image data. Specifically, the server 500 may map the plurality of images to a polyhedron. In this case, the server 500 may determine the method of mapping the plurality of images to the polyhedron on the basis of a location of a region of interest included in the plurality of images on the plurality of images. The server 500 may generate metadata including information on the location of the region of interest in step 530.

The server 500 may transmit the generated image data and metadata to the second image-processing device 400 in step 540.

The second image-processing device 400 may render an output frame using the received image data and metadata in step 550. In this case, the second image-processing device 400 may render the output frame including the region of interest on the basis of information on the location of the region of interest included in the metadata. For example, the region of interest included in the output frame may be rendered in a region corresponding to the location of the region of interest included in the plurality of images acquired by the image-processing device 300.

Figure 5:
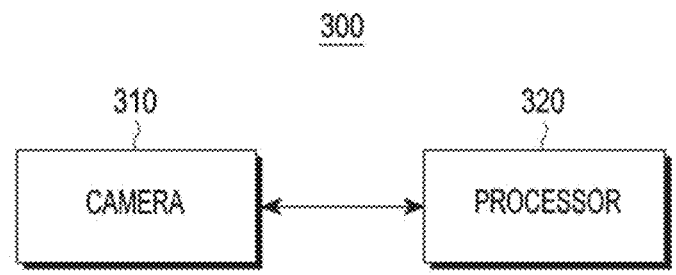
FIG. 5 is a block diagram of a first image-processing device according to various embodiments of the disclosure.

FIG. 5 is a block diagram of the first image-processing device according to various embodiments of the disclosure.

Referring to FIG. 5, the first image-processing device 300 may include a camera 310 (for example, the camera module 180 of FIG. 1) and a processor 320 (for example, the processor 120 of FIG. 1).

The camera 310 may capture an image of the surrounding environment or an object. The camera 310 may include a plurality of lenses to capture omnidirectional images. According to various embodiments, the camera 310 may include a plurality of cameras having different viewing angles to cover all directions.

The processor 320 may perform overall control of the first image-processing device 300.

According to an embodiment, the processor 320 may capture an image of the surrounding environment by controlling the camera 310. In this case, the processor 320 may acquire one or more images (or a plurality of images) by controlling the camera 310.

According to an embodiment, the processor 320 may map the plurality of acquired images into a polyhedron and map each face of the mapped polyhedron to a two-dimensional image. This mapping scheme will be described below in detail with reference to FIGS. 6A to 7G.

The processor 320 may map a plurality of images acquired from the camera 310 into a two-dimensional image. A sum of the plurality of images may be an omnidirectional image.

Various methods of mapping an image obtained by capturing a three-dimensional space to a two-dimensional image are already known. Among them, a representative method is Equirectangular Projection (ERP). ERP is equidistant cylindrical projection for converting spherical coordinates into Cartesian coordinates. However, when a three-dimensional spherical surface is mapped to a two-dimensional plane through ERP, greater distortion may occur as the image is closer to both poles (the North pole and the South pole) on the two-dimensional plane. Accordingly, ERP is limitedly able to accurately express an original three-dimensional image.

According to various embodiments of the disclosure, the first image-processing device 300 may map images captured in all directions (hereinafter, referred to as omnidirectional images) to a polyhedron and map images mapped to respective faces of the polyhedron to a two-dimensional image. According to various embodiments, the first image-processing device 300 may map the omnidirectional images to the surface of a first three-dimensional object, and may map the images mapped to the surface of the first three-dimensional object to the surface of a second three-dimensional object through calculations for converting the first three-dimensional object into the second three-dimensional object. Thereafter, the first image-processing device 300 may map the images mapped to the surface of the second three-dimensional object to the two-dimensional plane. For example, the first image-processing device 300 may map the image captured in all directions to a three-dimensional sphere having a predetermined radius (pertaining to, for example, a camera focal length or depth information) and may map the three-dimensional sphere to each face of a regular octahedron. Thereafter, the first image-processing device 300 may map each face of the regular octahedron to the two-dimensional image. The method includes, for example, an Octahedron Projection (OHP) method.

In the aforementioned example, the process of mapping the omnidirectionally captured image to the sphere and then mapping the sphere to the two-dimensional image has been described, but the disclosure is not limited thereto. For example, the two-dimensional image may be generated by directly applying the OHP method to a fisheye image, an ERP image, a CPP image, or an image mapped to various types of polyhedrons (for example, a tetrahedron, a dodecahedron, or an icosahedron). Further, the image mapped to the sphere or the two-dimensional image does not necessarily need to be an image captured through a camera. For example, a virtual image may be mapped to the sphere or the two-dimensional image.

The OHP method according to various embodiments of the disclosure is a method of mapping a three-dimensional spherical surface to a two-dimensional plane using an octahedron platonic solid. Hereinafter, various embodiments of mapping using a regular octahedron will be described, but the disclosure is not limited with regard thereto. According to an embodiment, a three-dimensional spherical surface may be mapped to a two-dimensional plane using a regular tetrahedron, a regular hexahedron, a regular dodecahedron, and a regular icosahedron. According to another embodiment, a three-dimensional spherical surface may be mapped to a two-dimensional plane using a polyhedron having a plurality of faces having different shapes.

Figure 6A:
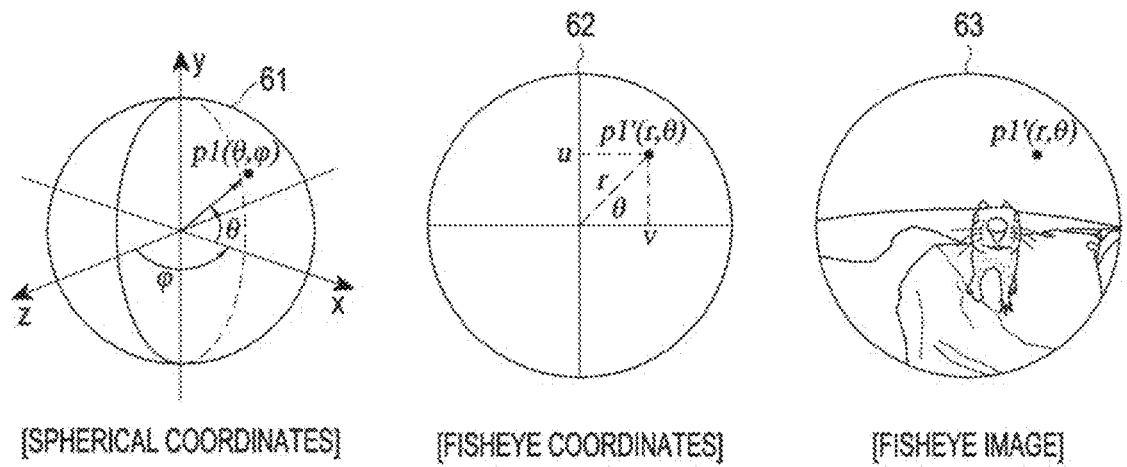
FIGS. 6A to 6C illustrate an OHP method according to various embodiments of the disclosure.
Figure 6B:
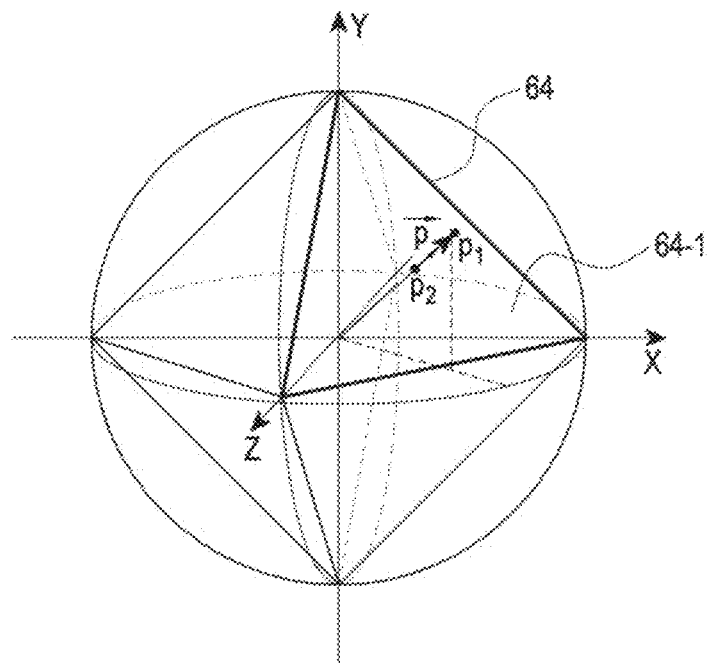
Figure 6C:
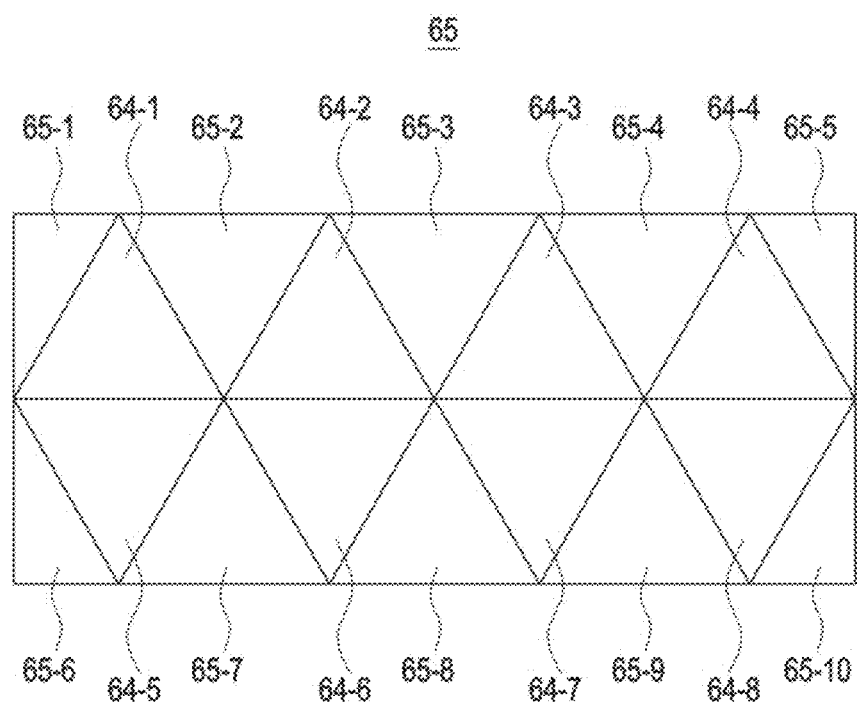

FIGS. 6A to 6C illustrate the OHP method according to various embodiments of the disclosure.

FIG. 6A illustrates a process of converting spherical coordinates 61 into coordinates (hereinafter, referred to as "fisheye coordinates") 62 of an image (hereinafter, referred to as a "fisheye image") 63 captured through a fisheye lens.

It is assumed that a point on the fisheye coordinates 62 of the fisheye image 63 corresponding to a point p1($\Phi$, $\theta$) on the spherical coordinates is p1'(r,$\theta$). The relationship between $\Phi$, $\theta$ of the spherical coordinates 61 and r, u, v of the fisheye coordinates 62 is as shown in [Equation 1] below.

$$r=\varphi/(\pi/2),\ u=\tfrac{1}{2}(1+\cos\theta),\ v=\tfrac{1}{2}(1+\sin\theta) \qquad \text{[Equation 1]}$$

The point p1($\Phi$, $\theta$) of the fisheye image 63 corresponds to the point p1($\Phi$, $\theta$) on the spherical coordinates 61 on the basis of [Equation 1] above. Not only the point p1($\Phi$, $\theta$) but also all points included in the fisheye image 62 may correspond to spherical coordinates 61. In this case, the aforementioned point may be, for example, a pixel. Accordingly, values of all pixels included in the fisheye image 63 may match the spherical coordinates 61.

Subsequently, the first image-processing device 300 may convert points of the spherical coordinates 61 into coordinates included in the face of the regular octahedron.

FIG. 6B illustrates an example of a method of corresponding a point p1 of the spherical coordinates 61 to a point p2 included in a face 64-1 of a regular octahedron 64.

For example, it is assumed that a vector from the central point of the spherical coordinates 61 to the point p1 is a vector $\vec{P}$.

On the vector $\vec{P}$, the point p1 and the point p2 exist. That is, the point p2 is an intersection point between the vector $\vec{P}$ and the face of the regular octahedron.

As a result, a point p1' of the fisheye image 63 matches the point p2 on the face 64-1 of the regular octahedron 64. For example, the value of a pixel corresponding to the point p1' on the fisheye image may be configured as a value of a pixel corresponding to the point p2 on the face 64-1 of the regular octahedron 64.

Subsequently, the faces of the regular octahedron 64 may be mapped to a two-dimensional plane 65.

For example, as illustrated in FIG. 6C the respective faces of the regular octahedron 64 may be mapped to first areas 64-1 to 64-8 of the two-dimensional image 65. Second areas 65-1 to 65-10 are areas to which no face of the regular octahedron 64 is mapped.

The second areas 65-1 to 65-10 are "no data" areas to which no face of the regular octahedron 64 is mapped and include no image data. Accordingly, the two-dimensional image 65 to which the fisheye image 63 in which lens distortion is corrected is mapped has actual image data volume which is significantly smaller than that of the two-dimensional image obtained by mapping the fisheye image 63 to a three-dimensional sphere according to the OHP method and then mapping the spherical image according to the ERP method. Therefore, when the two-dimensional image 65 to which the fisheye image 63 is mapped is encoded according to the OHP, it is possible to obtain larger compression efficiency compared to the case using the ERP.

Meanwhile, there are various methods of mapping the faces of the regular octahedron 64 to which the spherical coordinates 61 are mapped to the two-dimensional image. Such examples will be described with reference to FIGS. 7A to 7G. The method of mapping the regular octahedron 64 to the two-dimensional image is not limited to the following methods.

FIGS. 7A to 7G illustrate a method of mapping to a polyhedron according to various embodiments of the disclosure.

Figure 7A:
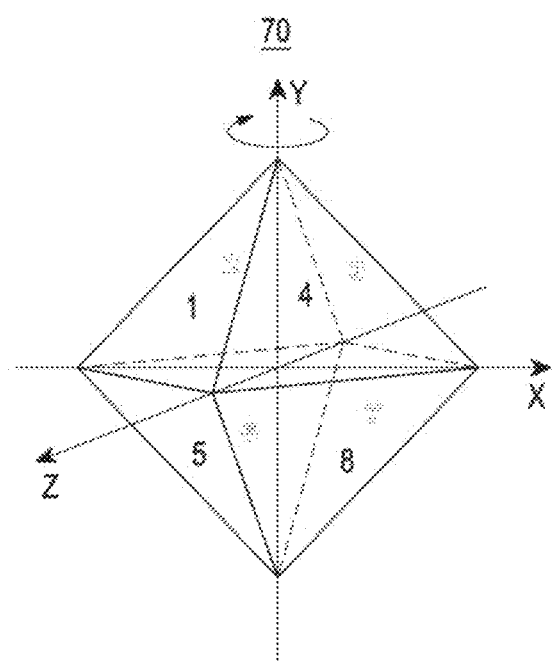
FIGS. 7A to 7G illustrate a method of mapping to a polyhedron according to various embodiments of the disclosure.

Referring to FIG. 7A, a regular octahedron 70 (for example, the regular octahedron 64 of FIG. 6B) includes 8 faces numbered from 1 to 8. Face 1 to face 4 of the regular octahedron 70 are defined as upper faces, and face 5 to face 8 are defined as lower faces. In this case, the number of upper faces and the number of lower faces are the same as each other, which is ½ of all faces. Further, sides of triangles on the plane having X and Z axes have a bearing of 360/(N/2) (N being the number of faces of a polyhedron) based on a Y axis of the polyhedron. For example, each face of the regular octahedron 70 splits the omnidirectional angle, that is, the 360 degrees surrounding the Y axis into 90-degree portions based on the Y axis in the upper part and the lower part. In another example, in the case of a hexadecahedron having 8 upper faces and 8 lower faces, each face of which is an isosceles triangle, each face of the hexadecahedron splits the omnidirectional angle, that is, the 360 degrees surrounding the Y axis into 45-degree portions based on the Y axis. Hereinafter, a method of arranging respective faces (face 1 to face 8) of the regular octahedron 70 of FIG. 7A on a two-dimensional image will be described with reference to FIGS. 7B to 7G.

Figure 7B:
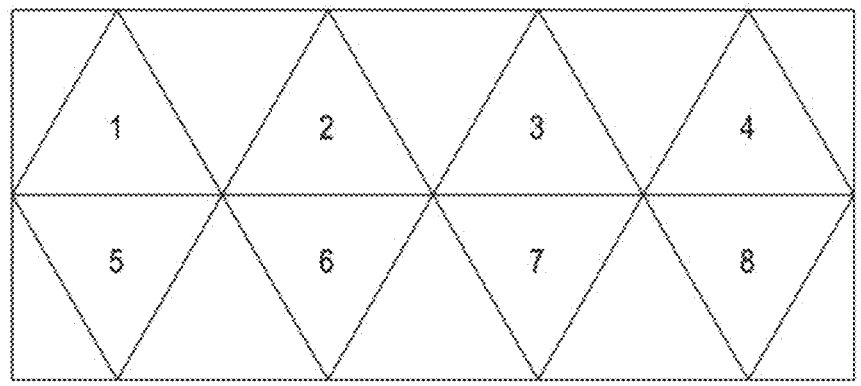

Referring to FIG. 7B, upper faces from face 1 to face 4 of the regular octahedron 70 may be arranged from left to right on the upper part of a two-dimensional image 71 in a clockwise direction. Further, lower faces from face 5 to face 8 of the regular octahedron 70 may be arranged from left to right on the lower part of the two-dimensional image 71 in a clockwise direction.

Figure 7C:
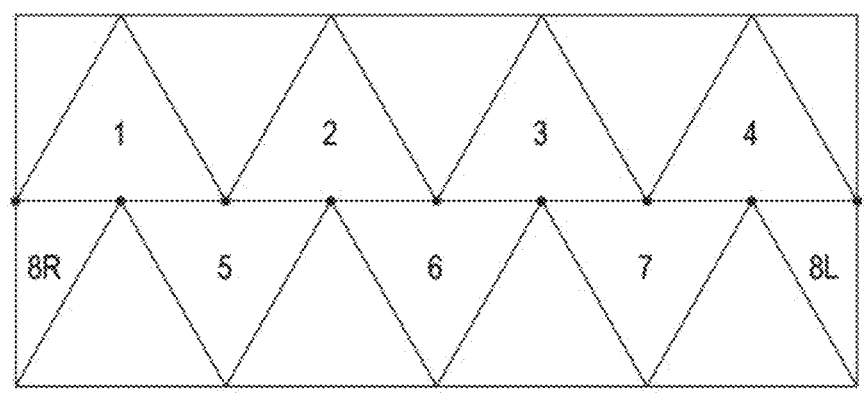

Referring to FIG. 7C, upper faces from face 1 to face 4 of the regular octahedron 70 may be arranged from left to right on the upper part of a two-dimensional image 72 in a clockwise direction. In the state in which lower faces of the regular octahedron 70 rotate 45 degrees in a counterclockwise direction from the center of a Y axis, face 5 to face 8 of the lower faces may be arranged from left to right on the lower part of the two-dimensional image 72 in a clockwise direction. In FIG. 7C, face 8L is a left face of face 8 and face 8R is a right face of face 8.

Figure 7D:
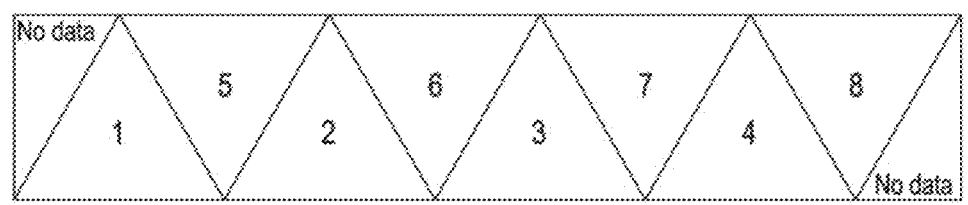

Meanwhile, the faces of the regular octahedron 70 may be arranged according to an array method of minimizing an area (a "no data" area) to which no image is mapped in the two-dimensional image 72. In this case, since the size of the two-dimensional image can be reduced by removing the "no data" area, encoding efficiency and image transmission efficiency can be increased. In other words, the "no data" area has no image mapped thereto, but has a predetermined pixel value (for example, one or more of black, a chroma-key color, and transparency), and the volume of data to be encoded or transmitted may be further reduced as the size of the "no data" area is further minimized. According to an embodiment, as illustrated in FIG. 7D, the upper faces (face 1 to face 4) and the lower faces (face 5 to face 8) of the regular octahedron 70 may be alternately arranged on the two-dimensional image 73.

Figure 7E:
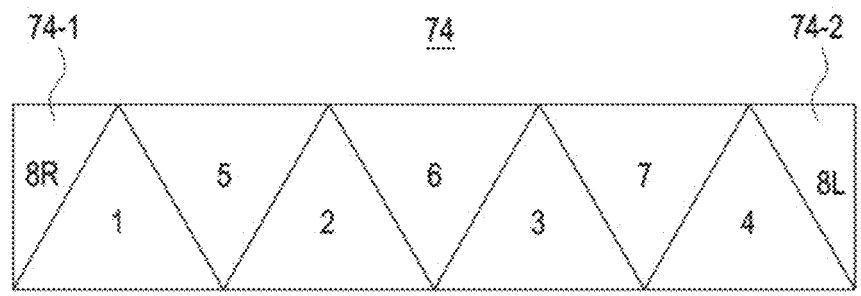

Referring to FIG. 7E, there may be a method of splitting face 8 of the regular octahedron 70 into face 8L (left) and face 8R (right) and mapping face 8L and face 8R to areas 84-1 and 84-2 of the two-dimensional image 74.

Figure 7F:
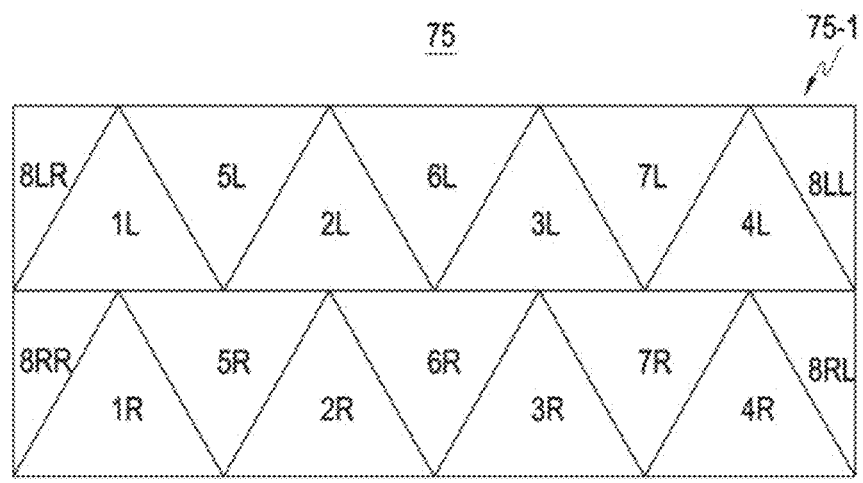

FIG. 7F illustrates a method of mapping a left-eye image of the three-dimensional image to a two-dimensional image. Referring to FIG. 7F, a left-eye image is mapped to an upper part 75-1 of a two-dimensional image 75 and a right-eye image is mapped to a lower part 75-2 of the two-dimensional image 75. Referring to FIG. 7F, with respect to face 1, face 1L is an image corresponding to a left eye and face 1R is an image corresponding to a right eye, and 8LL indicates a left half face of the triangle corresponding to the left eye and 8RL indicates a right half face of the triangle corresponding to the right eye. In FIG. 7F, the left-eye and right-eye images are arranged in a top-down type. In this case, metadata of the two-dimensional image 75 may be generated to include information indicating a stereoscopic image. For example, the image illustrated in FIG. 7F may be identified by one or more identifiers indicating that left-eye and right-eye images are arranged in a top-down type (for example, stereoscopic=true, stereoscopic_type=top-down).

According to various embodiments, a method of mapping upper faces of the left-eye image and the right-eye image of the stereoscopic shape of the regular octahedron 70 to the upper part of the two-dimensional image and mapping lower faces thereof to the lower part of the two-dimensional image (not shown) can be used. That is, triangles of each of the left-eye and right-eye images corresponding to face 1 to face 4 of the regular octahedron 70 may be arranged on the upper part, and triangles of each of the left-eye and right-eye images corresponding to face 5 to face 8 may be arranged on the lower part (hereinafter, referred to as a mixed type). This has an effect of making triangles including similar images close to each other, thereby improving encoding compression efficiency and transmission efficiency. Meanwhile, a method of reducing, when a three-dimensional image is mapped to a two-dimensional image, the width (a horizontal resolution and the number of pixels on a row) of the two-dimensional image may be also considered. Since every electronic device has a limitation on the width of a two-dimensional image used for rendering, the two-dimensional image can be rendered by a greater variety of electronic devices as the two-dimensional image has a narrower width.

Figure 7G:
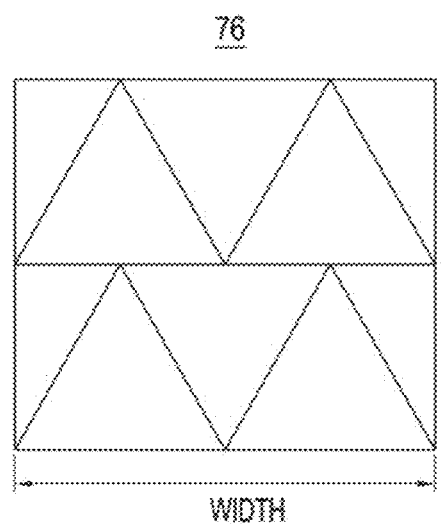

For example, referring to FIG. 7G, a two-dimensional image 76 includes the same amount of image data as the two-dimensional image of FIG. 7E, but the width of the two-dimensional image 76 is just half that of the two-dimensional image of FIG. 7E. The method of adjusting the width of the mapped two-dimensional image may be equally applied to a method of mapping a stereoscopic image including left-eye and right-eye images to a two-dimensional image.

The various embodiments of mapping the plurality of images (or omnidirectional images) to the two-dimensional image have been described above in detail. Hereinafter, an embodiment in which the location of the region of interest is considered in the embodiments for the mapping will be described in detail.

The processor 320 may set the region of interest among a plurality of acquired image regions. For example, the processor 320 may set the region of interest using a focus function in a capturing operation using the camera 310. The focus is a function of setting an object or a background in which the user may be interested as a main focusing region. In another example, the processor 320 may receive touch input for a region of an image or an object for setting the region of interest from the user and set the same as the region of interest. In another example, when a subject of interest is determined through, for example, object recognition, the processor 320 may set a region corresponding to the subject of interest as the region of interest. The region of interest may be processed with a higher quality than regions other than the region of interest.

According to an embodiment of the disclosure, smaller distortion and smaller data loss is generated in the case in which the region of interest is located in an equatorial region of the omnidirectional images (or a plurality of images acquired from the camera 310) or the OHP image to which the omnidirectional images are mapped compared to the case in which the region of interest is located in a polar region, and thus the region of interest may be mapped with a high quality. An embodiment of mapping the region of interest will be described in detail with reference to FIGS. 8A and 8B.

Figure 8A:
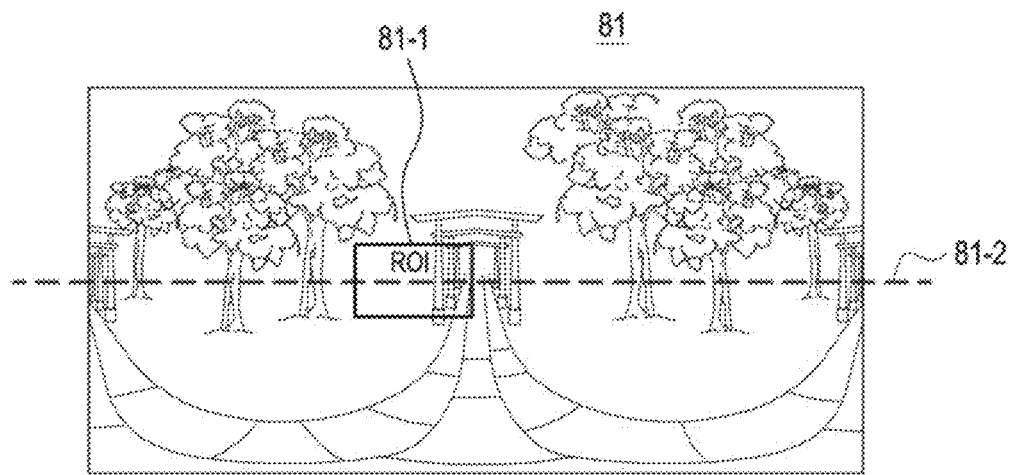
FIGS. 8A and 8B illustrate mapping of a region of interest according to various embodiments of the disclosure.
Figure 8B:
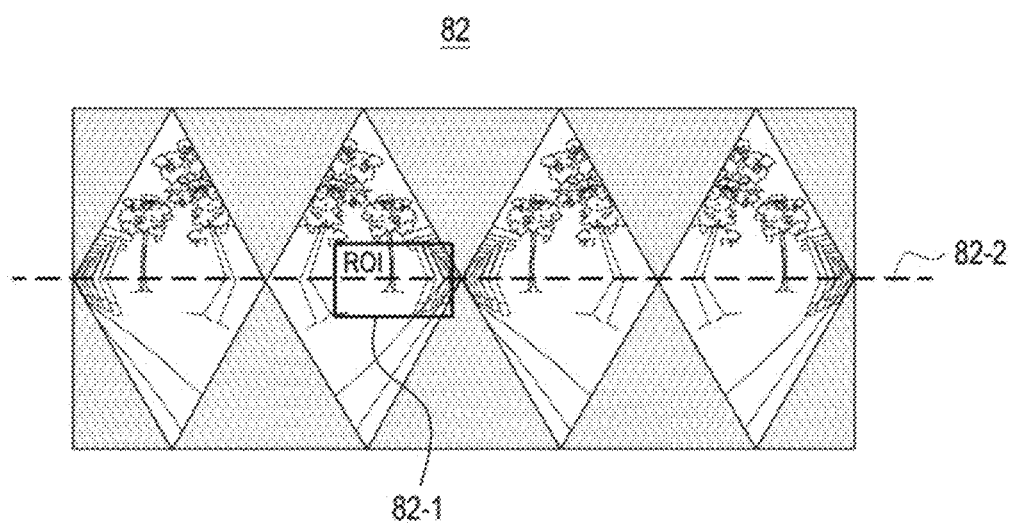

FIGS. 8A and 8B illustrate mapping of a region of interest according to various embodiments of the disclosure.

FIG. 8A illustrates an ERP image 81. The ERP image 81 may include a region of interest 81-1. In this case, the region of interest 81-1 may be located in an equatorial region 81-2 of the ERP image 81.

FIG. 8B illustrates an OHP image 82 to which the ERP image 81 is mapped. The OHP image 82 may include a region of interest 82-1. In this case, the region of interest 82-1 may be located in an equatorial region 82-2 of the OHP image 82.

As illustrated in FIGS. 8A and 8B, when the region of interest is included in the equatorial region of the ERP image or the OHP image, the amount of data lost during a process of processing the region of interest may be minimized. In this case, deterioration of the region of interest may be minimized.

Figure 9A:
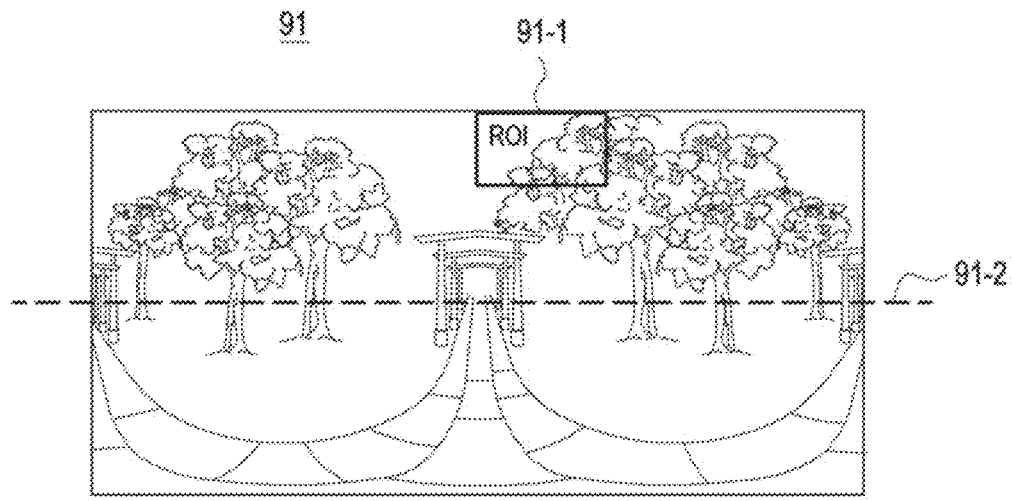
FIGS. 9A and 9B illustrate mapping of a region of interest according to various embodiments of the disclosure.
Figure 9B:
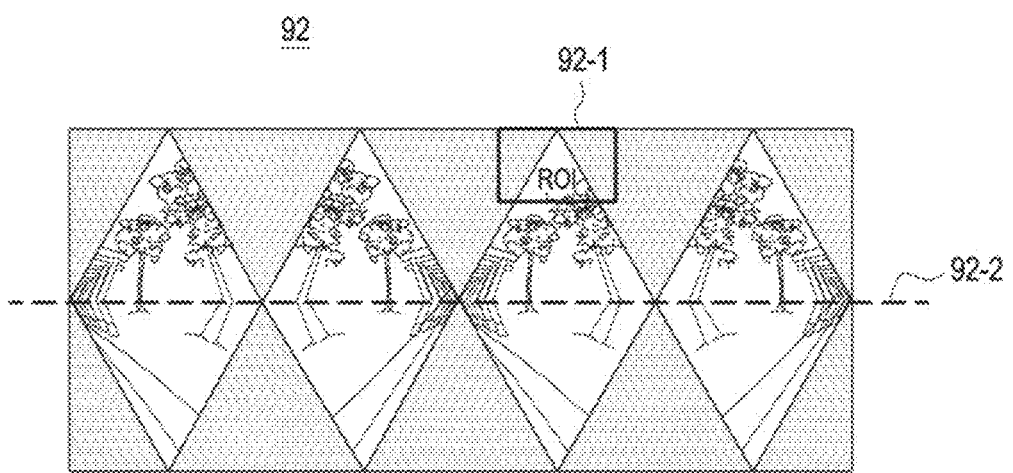

FIGS. 9A and 9B illustrate mapping of a region of interest according to various embodiments of the disclosure.

FIG. 9A illustrates an ERP image 91. The ERP image 91 may include a region of interest 91-1. In this case, the region of interest 91-1 may be located on an upper part of the ERP image 91 beyond an equatorial region 91-2 of the ERP image 91.

FIG. 9B illustrates an OHP image 92 to which the ERP image 91 is mapped. The OHP image 92 may include a region of interest 92-1. In this case, the region of interest 92-1 may be located on an upper part of the OHP image 92 beyond an equatorial region 92-2 of the OHP image 92.

In the case of FIG. 9B, a polar region has larger distortion compared to an equatorial region due to the characteristics of mapping, so that some of the data of the region of interest 92-1 may be lost compared to the region of interest 91-1 of the original ERP image 91.

Hereinafter, a method of minimizing data loss during the process of processing the region of interest even when the region of interest is included in an area other than the equator of the ERP image or the OHP image will be described in detail.

First, the processor 320 may generate an OHP image from a plurality of images acquired from the camera 310.

Figure 10:
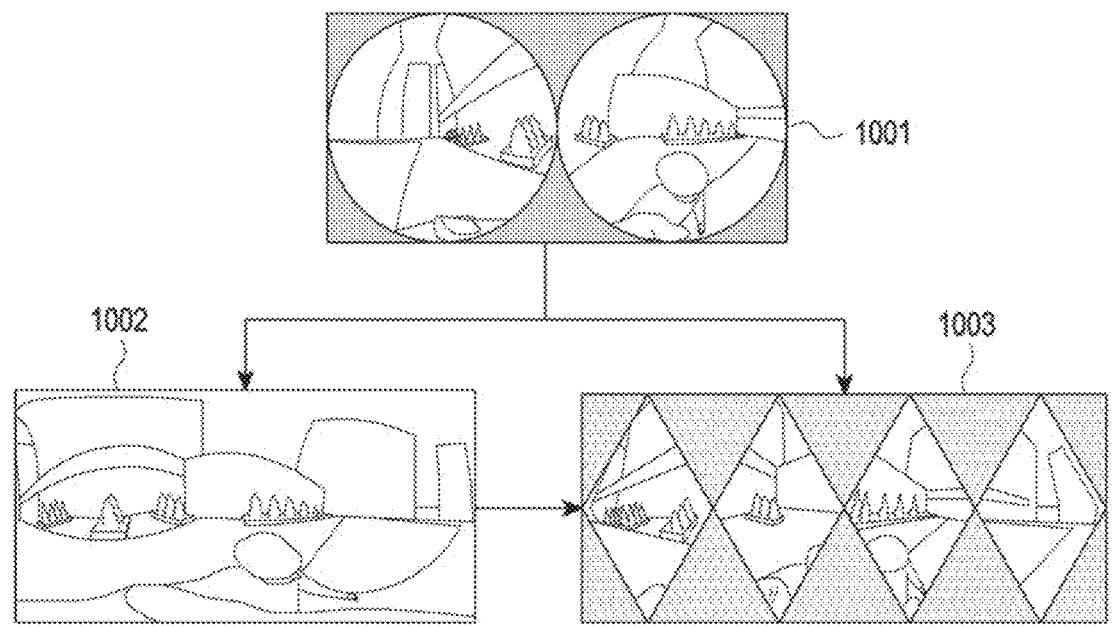
FIG. 10 illustrates generation of an OHP image according to various embodiments of the disclosure.

For example, referring to FIG. 10, the processor 320 may acquire a fisheye image 1001 from the camera 310. The processor 320 may convert the fisheye image 1001 into an ERP image 1002, or may convert the fisheye image 1001 into an OHP image 1003. Alternatively, the processor 320 may convert the converted ERP image 1002 into the OHP image 1003.

The processor 320 may set a region of interest on the basis of a focus region or a user touch input.

Figure 11A:
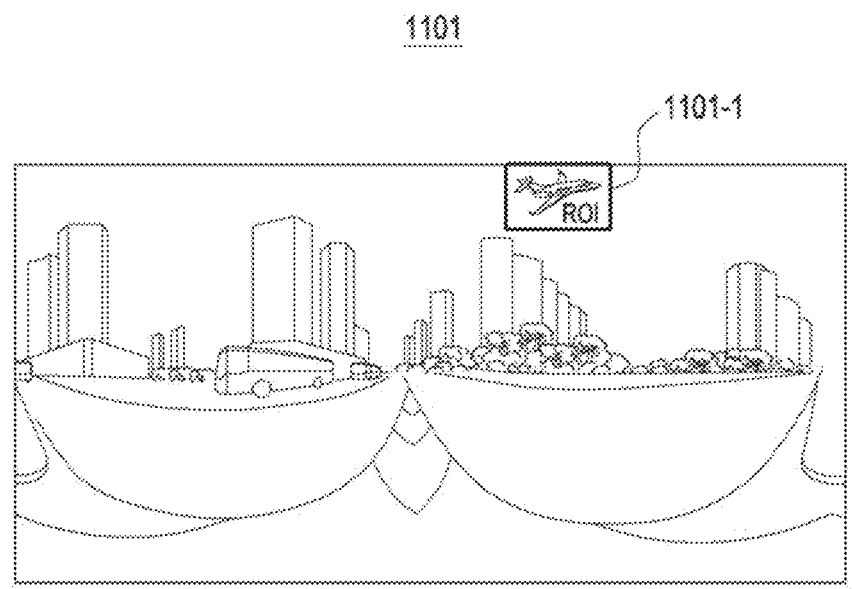
FIGS. 11A to 11E illustrate a change in an OHP mapping scheme according to various embodiments of the disclosure.

For example, referring to FIG. 11A, a Region of Interest (ROI) 1101-1 is included in an upper part of the ERP image 1101 (or a polar region of a sphere on the basis of mapping of the ERP image 1101 to a spherical face).

Figure 11B:
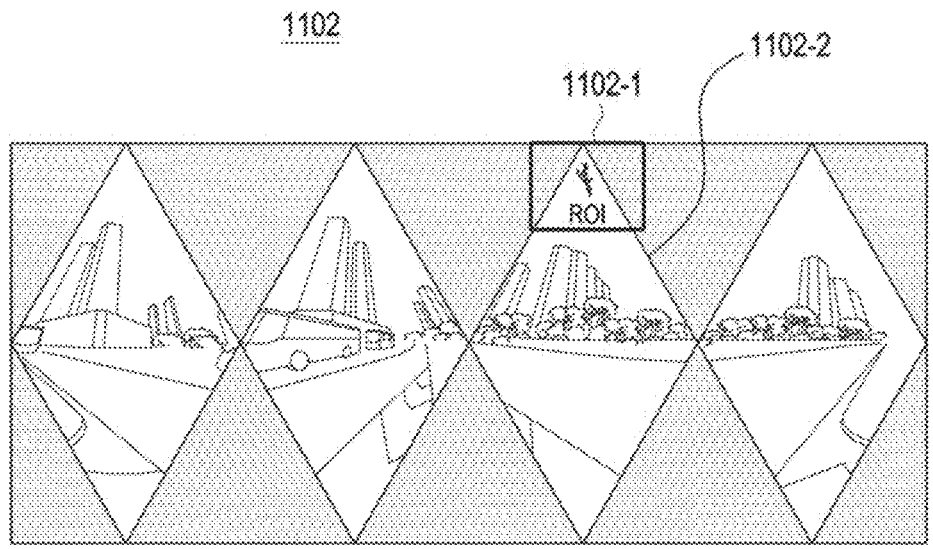

FIG. 11B illustrates the case in which the region of interest 1101 is mapped to a region of interest 1102-1 of an OHP image 1102. However, in this case, more data in the region of interest 1102-1 may be lost compared to the loss of data in the region of interest 1101-1 as described above.

An embodiment of preventing the data from being lost will be described with reference to FIG. 11C.

Figure 11C:
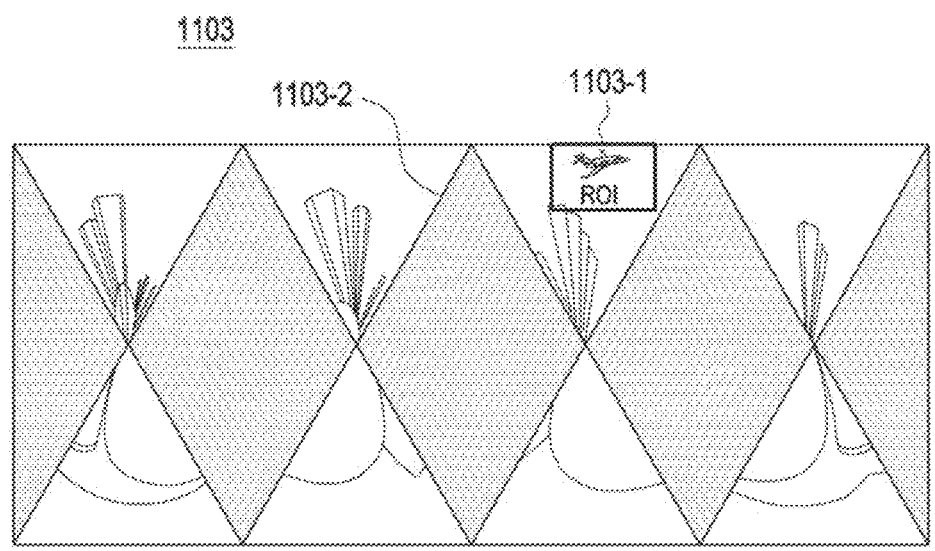

FIG. 11C illustrates an OHP image 1103. The processor 320 may map the region of interest 1101-1 of FIG. 11A to a region of interest 1103-1 of an OHP image 1103.

To this end, the processor 320 may determine a new mapping scheme on the basis of the mapping scheme and the location of the region of interest 1101-1. The mapping scheme may be defined as a scheme of mapping a plurality of images or omnidirectional images acquired from the camera 310 to an OHP image.

For example, when the processor 320 determines that the mapping scheme is the same as that of the OHP image 1102 of FIG. 11B and the region of interest 1101-1 or 1102-1 is located on the upper part of the ERP image 1101 or the OHP image 1102, the processor 320 may change the conventional mapping scheme to a new mapping scheme (region-wise packing) of the OHP image 1103 of FIG. 11C.

While the region of interest 1102-1 is included in an edge area of the triangle 1102-2 corresponding to one face of the polyhedron in the conventional mapping scheme, the region of interest 1103-1 may be included in a region of one side of the triangle 1103-2 in the new mapping scheme.

Accordingly, data of the region of interest 1103-1 may have a higher quality than data of the region of interest 1102-1 in the new mapping scheme.

Figure 11D:
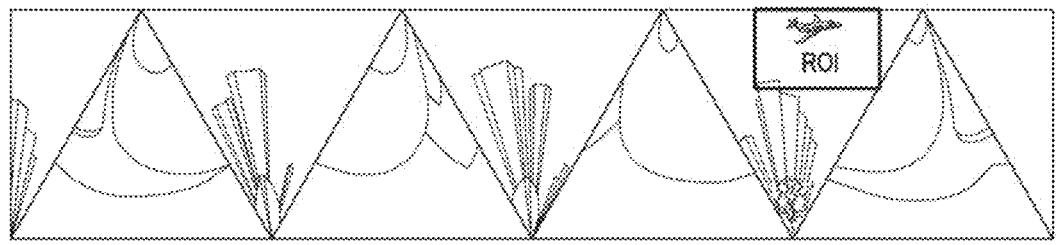

In another example of the new mapping scheme, the ERP image 1101 of FIG. 11A may be mapped to an OHP image 1104 of FIG. 11D.

Figure 11E:
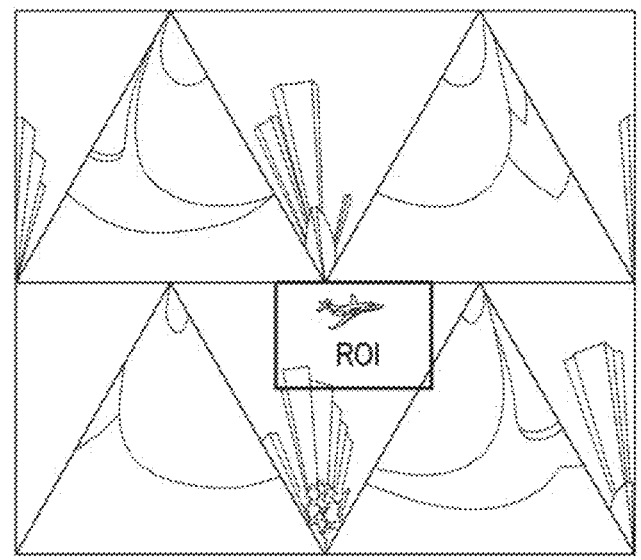

In another example of the new mapping scheme, the ERP image 1101 of FIG. 11A may be mapped to an OHP image 1105 of FIG. 11E.

As described in the above example, the processor 320 may perform OHP image mapping or polyhedron image mapping on a plurality of image regions acquired through a predetermined scheme (for example, the OHP image-mapping schemes of FIGS. 11C to 11E).

In order to determine the mapping scheme for the mapping, the processor 320 may determine the location of the region of interest according to the mapping scheme. Further, the processor 320 may determine whether the location of the region of interest according to the mapping scheme is included in a predetermined condition.

According to an embodiment of the disclosure, the predetermined condition may be the case in which the region of interest corresponds to a preset region among regions of a plurality of images. The preset region may be, for example, a predetermined region in the upper part of the ERP image 1101 of FIG. 11A. In another example, the preset region may be a predetermined region in the upper part of the OHP image 1102 of FIG. 11B. In another example, the preset region may be set on the basis of an image region compression rate or a data loss rate in the image region.

According to another embodiment of the disclosure, the predetermined condition may be the case in which, when the region of interest is mapped to a polyhedron through a specific mapping scheme, the region of interest corresponds to a preset region of one face of the polyhedron.

When the location of the region of interest is included in the predetermined condition, a first compression rate (or a compression loss rate) of the region of interest in the case of mapping to the polyhedron through a first predetermined scheme may be larger than a second compression rate of the region of interest in the case of mapping to the polyhedron through a second predetermined scheme.

For example, the first compression rate of the region of interest in the case of the mapping scheme (first predetermined scheme) of the OHP image 1102 of FIG. 11B may be larger than the second compression rate of the region of interest in the case of the mapping scheme (second predetermined scheme) of the OHP 1103 of FIG. 11C.

The OHP image may be defined as a two-dimensional image to which each face of the polyhedron is mapped through a specific mapping scheme. Further, the processor 320 may perform image datafication on the OHP image and transmit the OHP image to the second image-processing device 400.

The processor 320 may map a plurality of images (or omnidirectional images) acquired from the camera 310 to the OHP image (for example, a two-dimensional image) and generate metadata for the corresponding mapping scheme. For example, the processor 320 may generate and transmit metadata including array attribute information (described below in detail) of the polyhedron according to the second predetermined scheme.

The processor 320 may map the omnidirectional images to the two-dimensional image through an OctaHedron Projection (OHP) scheme. The processor 320 may generate metadata using coordinate values when the omnidirectional images are mapped to the two-dimensional image.

According to an embodiment of the disclosure, the processor 320 may map omnidirectional images to respective faces of a regular octahedron, and may map the respective faces of the regular octahedron to which the omnidirectional images are mapped to the two-dimensional image. At this time, the processor 320 may match vertex coordinates of each face of the regular octahedron and vertex coordinates of the mapped two-dimensional image and generate metadata on the basis of the information. It is assumed that the omnidirectional images are mapped to the regular octahedron, but the entity to which the omnidirectional images are mapped is not limited to a regular octahedron. For example, the processor 320 may map the respective faces of the mapped octahedron to the two-dimensional image after mapping the omnidirectional images to the octahedron. In this case, each face of the octahedron may be an isosceles triangle or a triangle that does not have a pair of equal sides. In another example, the processor 320 may map the omnidirectional images to respective faces of a hexadecahedron and map some of the regions included in the faces of the mapped hexadecahedron to a two-dimensional image. In the above-described example, the processor 320 may match each vertex of the octahedron or the hexadecahedron and each vertex of the two-dimensional image and generate metadata on the basis of the information.

According to an embodiment of the disclosure, the metadata may include type information of the polyhedron and array attribute information of a plurality of image regions included in the two-dimensional image (for example, the OHP image).

For example, the type information of the polyhedron may be defined as "01" in the case of a regular octahedron and "11" in the case of a regular icosahedron.

The array attribute information may indicate a mapping relationship between each face of the polyhedron and each of the plurality of image areas.

For example, it is assumed that, when the polyhedron is a regular octahedron, faces 1 to 8 of the regular octahedron, numbered with positive integers, are mapped to a plurality of image regions a to h included in the two-dimensional image frame. In this case, the array attribute information may indicate a mapping relationship between each face of the three-dimensional polyhedron and each of the plurality of image areas included in the two-dimensional image frame.

The array attributes may vary. This is because the polyhedron type varies, such as a regular tetrahedron and a regular octahedron, and each face of the polyhedron may be mapped to the two-dimensional frame in various ways.

For example, the array type of the plurality of image regions in FIG. 7B may be defined as array attributes "001", and array attributes of the plurality of image regions in FIG. 7C may be defined as "011". "001" and "011" may be stored in metadata as sub-type information.

The array attribute information may further include coordinate information (for example, vertex information). That is, the array attribute information may include mesh information between coordinate systems. According to an embodiment, the array attribute information may include matching information of spatial coordinates of each vertex of one face of the polyhedron and planar coordinates of an image area of the two-dimensional image to which one face of the polyhedron is mapped.

The processor 320 may determine a region of interest. Specifically, the processor 320 may determine the location of the region of interest according to a mapping scheme. For example, when it is determined that the location of the region of interest according to the mapping scheme is in a preset region, the processor 320 may change the mapping scheme for mapping regions of a plurality of images acquired from the camera 310 to an OHP image (see the description of FIGS. 11A to 11E). In this case, the metadata may include information on the changed mapping scheme (including for example at least one piece of type information of the polyhedron, subtype information, and array attribute information of a plurality of image regions included in a two-dimensional image (for example, an OHP image)).

According to an embodiment of the disclosure, the metadata may further include information on the region of interest. The information on the region of interest may be information for specifying the location of the region of interest (or location information of the region of interest).

For example, the information on the region of interest may be location information of the region of interest (for example, coordinate information) based on a plurality of images acquired from the camera 310.

In another example, the information on the region of interest may be location information of the region of interest based on the ERP image to which a plurality of images acquired from the camera 310 is mapped.

In another example, the information on the region of interest may be location information of the region of interest (for example, space coordinate information) based on the polyhedron to which a plurality of images acquired from the camera 310 is mapped.

In another example, the information on the region of interest may be location information of the region of interest based on a first OHP image to which a plurality of images acquired from the camera 310 is mapped in a first mapping scheme.

In another example, the information on the region of interest may be information on a difference between the location of the region of interest included in the first OHP image to which the plurality of images acquired from the camera 310 is mapped in the first mapping scheme and the location of the region of interest included in a second OHP image to which the plurality of images acquired from the camera 310 is mapped in a second mapping scheme (offset information, for example, information on a difference value between coordinates indicating the two locations). For example, the OHP image may be generated in the first mapping scheme after a plurality of omnidirectional images is moved by an offset. In this case, the location of the region of interest may be in a high-definition region of the OHP image without any change in the mapping scheme.

Further, the information on the region of interest may include an indicator indicating that the region of interest is included in the generated OHP image.

When there is a request for image data obtained by encoding the OHP image, the metadata may be transmitted together with or separately from the encoded image data, or may be transmitted to a specific device or module independently from the request for the image data.

The method by which the processor 320 generates image data for the OHP image may be implemented in various ways.

According to an embodiment of the disclosure, the processor 320 may acquire a plurality of images through the camera 310. When the location of the region of interest is included in a first predetermined condition, the processor 320 may map the plurality of images to a polyhedron through a first predetermined scheme. Alternatively, when the location of the region of interest is included in a second predetermined condition, the processor 320 may map the plurality of images to a polyhedron through a second predetermined scheme. In this case, the processor 320 may generate image data for the OHP image using the polyhedron to which the plurality of images is mapped through one of the first predetermined scheme or the second predetermined scheme.

According to another embodiment of the disclosure, the processor 320 may acquire a plurality of images using the camera 310. The processor 320 may map the plurality of images to a polyhedron through the first predetermined scheme. In this case, the processor 320 may identify the location of the region of interest among the plurality of images mapped to the polyhedron, and when the location of the region of interest is included in a predetermined condition in connection with the plurality of images mapped to the polyhedron, map the plurality of images to the polyhedron through a second predetermined scheme. The processor 320 may generate image metadata for the OHP image using the polyhedron to which the plurality of images is mapped through the second predetermined scheme.

Figure 12:
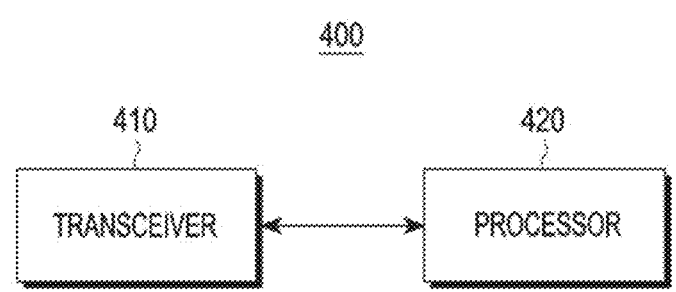
FIG. 12 is a block diagram of a second image-processing device according to various embodiments of the disclosure.

FIG. 12 is a block diagram of the second image-processing device according to various embodiments of the disclosure.

Referring to FIG. 12, the second image-processing device 400 may include a transceiver 410 (for example, the communication module 190 of FIG. 1) and a processor 420 (for example, the processor 120 of FIG. 1).

The transceiver 410 receives data from the first image-processing device 300. For example, the transceiver 410 may receive at least one piece of image data and metadata of the image data from the first image-processing device 300.

The processor 420 may perform overall control of the second image-processing device 400.

For example, the processor 420 may render an output frame on the basis of the image data received from the second image-processing device 400.

In order to render the output frame, the processor 420 may use metadata.

For example, the processor 420 may render the output frame on the basis of type information, subtype information, or array attribute information included in the metadata of the received image data (for example, OHP image data).

In another example, the processor 420 may use information on a region of interest. For example, the processor 420 may recognize processing of the region of interest on the basis of an indicator included in the information on the region of interest (for example, indicating that the region of interest is included in the OHP image). In this case, the processor 430 may determine the location of the region of interest on the basis of location information of the region of interest included in the information on the region of interest. Accordingly, the processor 420 may determine that the rendering importance of the region of interest is high, and may render the region of interest with a high priority.

Figure 13:
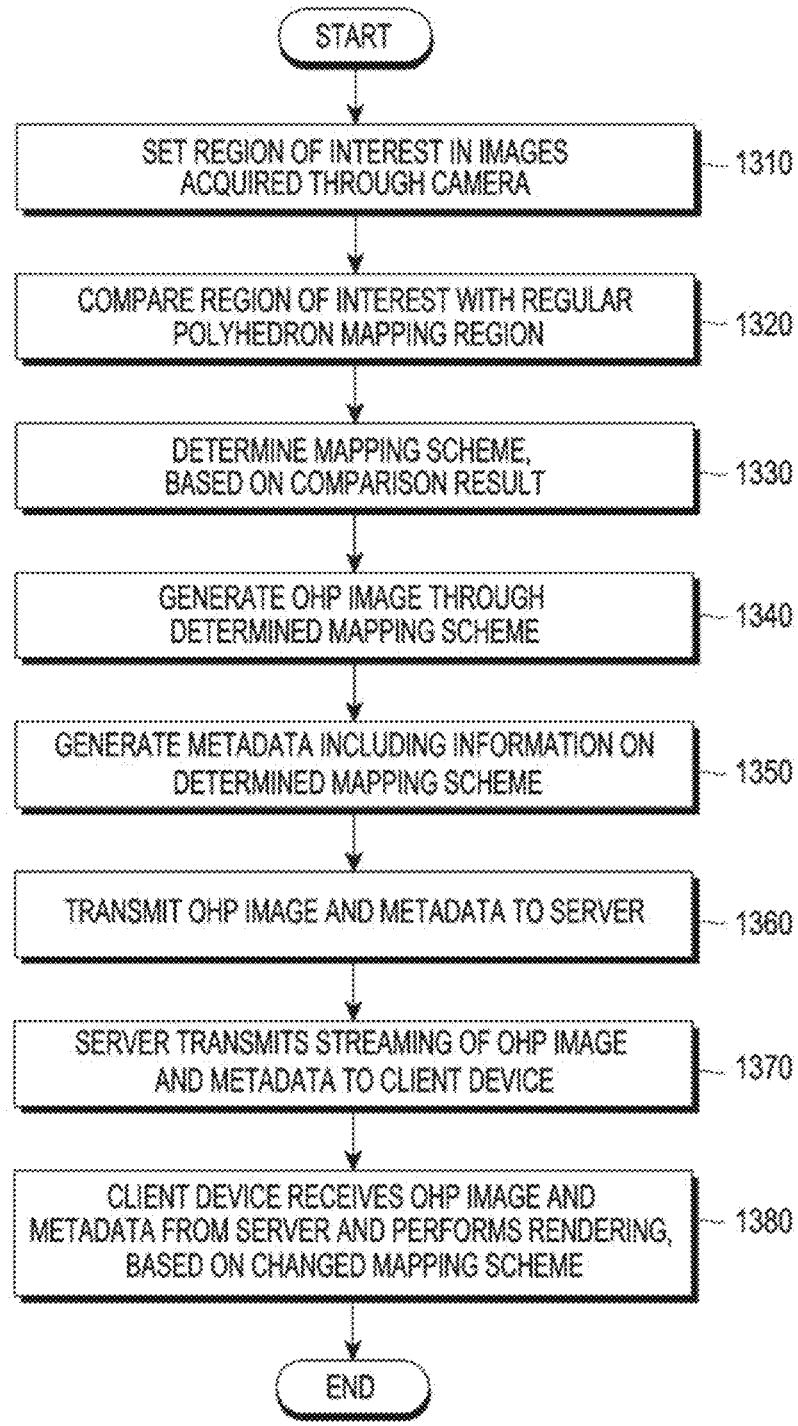
FIG. 13 is a flowchart illustrating the operation of the image-processing system according to various embodiments of the disclosure.

FIG. 13 is a flowchart illustrating the operation of the image-processing system according to various embodiments of the disclosure.

First, the first image-processing device 300 may set, for example, a region of interest in an image acquired using the camera 320 in step 1310. The first image-processing device 300 may compare the region of interest with a mapping region in which a regular polyhedron is mapped to a two-dimensional image in step 1320. In this case, the first image-processing device 300 may determine a mapping scheme on the basis of the comparison result in step 1330. The first image-processing device 300 may generate an OHP image through the determined mapping scheme in step 1340. The first image-processing device 300 may generate metadata including information on the determined mapping scheme in step 1350. The first image-processing device 300 may transmit the OHP image and the metadata to a server in step 1360. The server may transmit the OHP image and the metadata to a client device, for example, the second image-processing device 400, in step 1370. The client device may receive the OHP image and the metadata from the server and perform rendering based on a mapping scheme corresponding to the received OHP image in step 1380.

Figure 14:
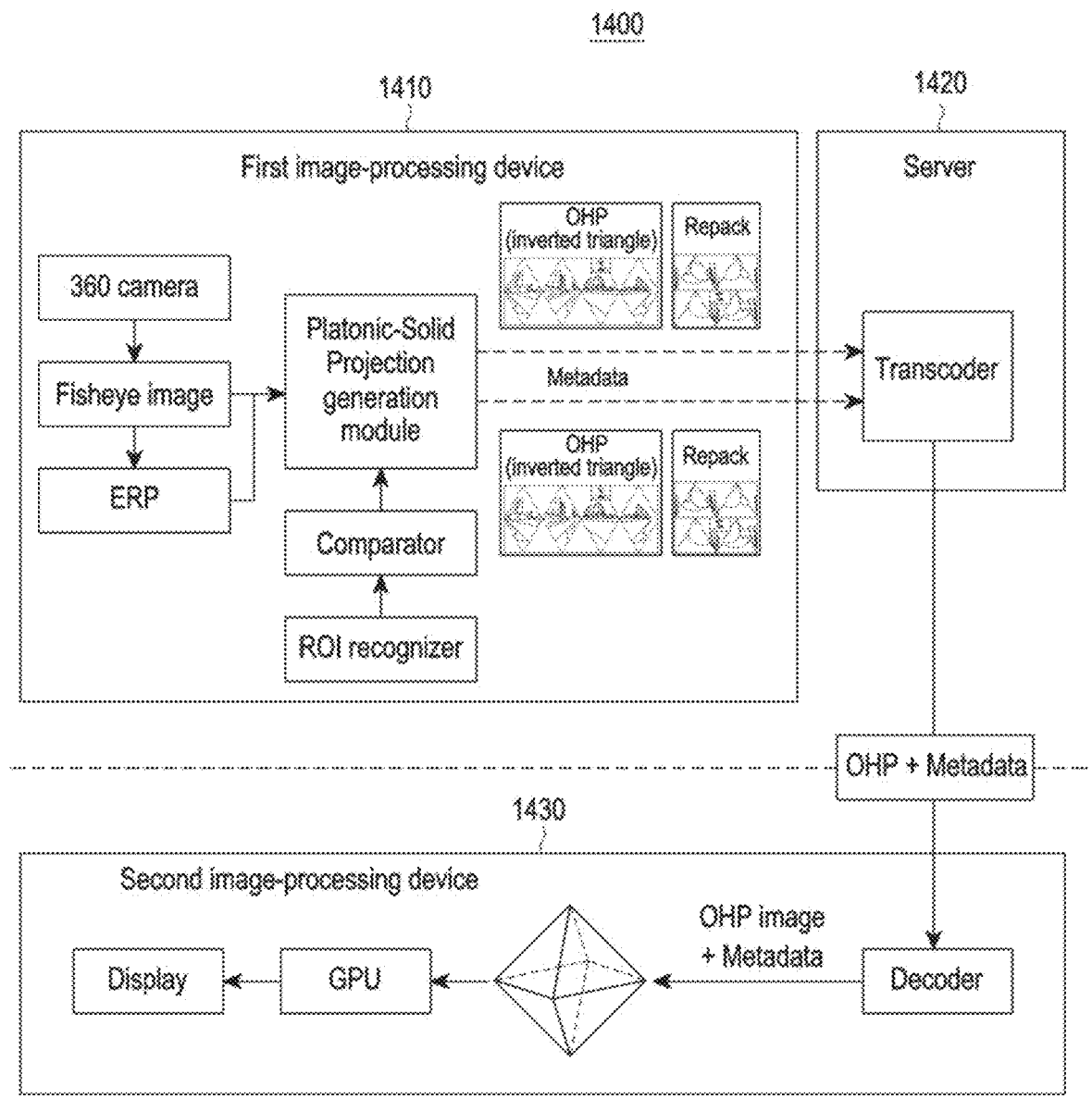
FIG. 14 is a block diagram of an image-processing system according to various embodiments of the disclosure.

FIG. 14 is a block diagram of an image-processing system according to various embodiments of the disclosure.

Referring to FIG. 14, an image-processing system 1400 may include a first image-processing device 1410, a server 1420, and a second image-processing device 1430.

Hereinafter, for convenience of description, embodiments will be described on the basis of the operation of the first image-processing device 1410, the server 1420, and the second image-processing device 1430, but it may be understood that operations are performed under the control of a processor included in the first image-processing device 1410, the server 1420, and the second image-processing device 1430.

The first image-processing device 1410 may acquire a plurality of omnidirectional images (for example, fisheye images) from the camera. The first image-processing device 1410 may generate an ERP image on the basis of the plurality of acquired images, or may perform OHP conversion through platonic-solid projection. Platonic-solid may be performed on the basis of the ERP image.

The location of the region of interest may be recognized through an ROI recognizer of the first image-processing device 1410. The first image-processing device 1410 may compare the location of the region of interest with the location of the region of interest to which OHP conversion is applied through a comparator. The first image-processing device 1410 may change an OHP mapping scheme on the basis of the conversion result and perform OHP conversion on the basis of the changed mapping scheme. For example, the first image-processing device 1410 may change the OHP mapping scheme from a scheme of mapping the OHP on the basis of two triangles having intersecting sides to a scheme of mapping the OHP on the basis of two triangles having intersecting points. The first image-processing device 1410 may repackage the mapped OHP image through a packaging method of minimizing a no-data region. The first image-processing device 1410 may transmit the repackaged image data and metadata of the repackaged image data to the server 1420.

In the above example, the first image-processing device 1410 may process a plurality of omnidirectional images through a paired terminal.

For example, the first image-processing device 1410 may acquire the plurality of omnidirectional images and transmit the omnidirectional images to the paired terminal. In this case, the terminal may generate an ERP image on the basis of the plurality of acquired images, or may perform OHP conversion through platonic-solid projection. Platonic-solid may be performed on the basis of the ERP image.

Further, the terminal may recognize the location of the region of interest through the ROI recognizer. The terminal may compare the location of the region of interest with the location of the region of interest to which OHP conversion is applied through the comparator. The terminal may change the OHP mapping scheme on the basis of the conversion result and perform OHP conversion on the basis of the changed mapping scheme. For example, the terminal may change the OHP mapping scheme from a scheme of mapping the OHP on the basis of two triangles having intersecting sides to a scheme of mapping the OHP on the basis of two triangles having intersecting points. The terminal may repackage the mapped OHP image through a packaging method of minimizing a no-data region. The terminal may transmit the repackaged image data and metadata of the repackaged image data to the server 1420 or the paired first image-processing device 1410.

A transcoder of the server 1420 may perform transcoding on the basis of the repackaged image data and the metadata. The server may transmit the transcoded OHP image and the metadata to the second image-processing device 1430.

The second image-processing device 1430 may decode the received OHP image and the metadata. The second image-processing device 1430 may map the OHP image to a polyhedron on the basis of the metadata. A GPU of the second image-processing device 1430 may render the output frame on the basis of the mapped polyhedron and display the output frame.

Figure 15:
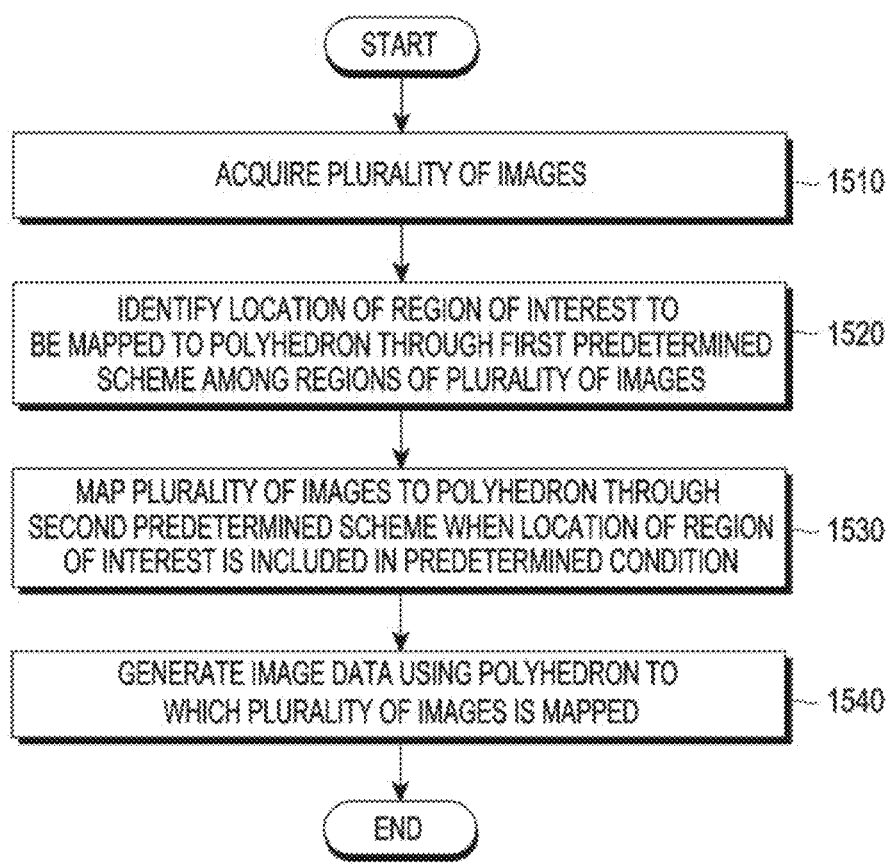
FIG. 15 is a flowchart illustrating an image-processing method according to various embodiments of the disclosure.

FIG. 15 is a flowchart illustrating an image-processing method according to various embodiments of the disclosure.

First, an electronic device (for example, an image-processing device) may acquire a plurality of images through a plurality of cameras in step 1510. The electronic device may identify the location of a region of interest to be mapped to a polyhedron through a first predetermined method among regions of a plurality of images in step 1520. When the location of the region of interest is included in a predetermined condition, the electronic device may map a plurality of images to a polyhedron through a second predetermined method in step 1530. The electronic device may generate image data using the polyhedron to which the plurality of images is mapped in step 1540.

Meanwhile, the image-processing method according to various embodiments of the disclosure may be provided to a server or a device to be executed by a processor, and may be implemented by a computer-executable program code and stored in various non-transitory computer-readable media.

For example, a non-transitory computer-readable medium storing a program for performing a process of acquiring a plurality of images using a plurality of cameras, a process of identifying a location of a region of interest to be mapped to a polyhedron through a first predetermined scheme among regions of the plurality of images, a process of mapping the plurality of images to the polyhedron through a second predetermined scheme when the location of the region of interest is included in a predetermined condition, and a process of generating image data using the polyhedron to which the plurality of images is mapped may be provided.

A non-transitory computer-readable medium is a medium which semi-permanently stores data and can be read by a device, rather than a medium which stores data for a short time, such as a register, cache, or memory. Specifically, the aforementioned various applications or programs may be provided in the form of being stored in a non-transitory computer-readable medium, such as a CD, a DVD, a hard disc, a Blu-ray disc, a USB, a memory card, or a ROM.

Meanwhile, although the exemplary embodiments of the disclosure have been illustrated and described, the disclosure is not limited thereto. It is apparent that various modified implementations can be made by those skilled in the art without departing from the scope of the disclosure claimed by the claims, and such modified implementations should not be construed as falling outside the technical idea or purview of the disclosure.

The invention claimed is:

1. An electronic device comprising:
   a plurality of cameras; and
   a processor,
   wherein the processor is configured to acquire a plurality of images through the plurality of cameras,
   identify a location of a region of interest to be mapped to a polyhedron through a first predetermined scheme among regions of the plurality of images,
   map the plurality of images to the polyhedron through a second predetermined scheme when the location of the region of interest is included in a predetermined condition, and
   generate image data using the polyhedron to which the plurality of images is mapped.

2. The electronic device of claim 1, wherein the processor is configured to set the region of interest, based at least on a touch input for at least some of the plurality of images for setting a focus region related to acquisition of the plurality of images or the region of interest.

3. The electronic device of claim 1, wherein, when the region of interest corresponds to a preset region among the regions of the plurality of images, the processor is configured to determine that the predetermined condition is satisfied.

4. The electronic device of claim 3, wherein the preset region is set based on an image region compression rate or a data loss rate of an image region.

5. The electronic device of claim 1, wherein, when the region of interest corresponds to a preset region of one face of the polyhedron, the processor is configured to determine that the predetermined condition is satisfied.

6. The electronic device of claim 1, wherein, when the location of the region of interest is included in the predetermined condition, a first compression rate of the region of interest for mapping to the polyhedron through the first predetermined scheme is larger than a second compression rate of the region of interest for mapping to the polyhedron through the second predetermined scheme.

7. The electronic device of claim 1, wherein the processor is configured to generate metadata including array attribute information of the polyhedron according to the second predetermined scheme.

8. An electronic device comprising:
a plurality of cameras; and
a processor,
wherein the processor is configured to acquire a plurality of images using the plurality of cameras, identify a location of a region of interest to be mapped to a polyhedron through a first predetermined scheme among regions of the plurality of images, map the plurality of images to the polyhedron through the first predetermined scheme when the location of the region of interest is included in a first predetermined condition, map the plurality of images to the polyhedron through a second predetermined scheme when the location of the region of interest is included in a second predetermined condition, and generate image data using the polyhedron to which the plurality of images is mapped through one of the first predetermined scheme or the second predetermined scheme.

9. The electronic device of claim 8, wherein the processor is configured to set the region of interest, based at least on a touch input for at least some of the plurality of images for setting a focus region related to acquisition of the plurality of images or the region of interest.

10. The electronic device of claim 8, wherein the processor is configured to determine that the first predetermined condition is satisfied when the region of interest does not correspond to a preset region among the regions of the plurality of images, and to determine that the second predetermined condition is satisfied when the region of interest corresponds to the preset region among the regions of the plurality of images.

11. The electronic device of claim 8, wherein the processor is configured to determine that the first predetermined condition is satisfied when the region of interest corresponds to a first region of one face of the polyhedron, and to determine that the second predetermined condition is satisfied when the region of interest corresponds to a second region of one face of the polyhedron.

12. An electronic device comprising:
a plurality of cameras; and
a processor,
wherein the processor is configured to acquire a plurality of images using the plurality of cameras, map the plurality of images to a polyhedron through a first predetermined scheme, identify a location of a region of interest among the plurality of images mapped to the polyhedron, map the plurality of images to the polyhedron through a second predetermined scheme when the location is included in a predetermined condition in connection with the plurality of images mapped to the polyhedron, and generate image data using the polyhedron to which the plurality of images is mapped through the second predetermined scheme.

13. The electronic device of claim 12, wherein the processor is configured to set the region of interest, based at least on a touch input for at least some of the plurality of images for setting a focus region related to acquisition of the plurality of images or the region of interest.

14. The electronic device of claim 12, wherein the processor is configured to determine that the first predetermined condition is satisfied when the region of interest corresponds to a first region of one face of the polyhedron, and to determine that the second predetermined condition is satisfied when the region of interest corresponds to a second region of one face of the polyhedron.

15. The electronic device of claim 12, wherein, when the location of the region of interest is included in the second predetermined condition, a first compression rate of the region of interest for mapping to the polyhedron through the first predetermined scheme is larger than a second compression rate of the region of interest for mapping to the polyhedron through the second predetermined scheme.

* * * * *